United States Patent [19]

Harris

[11] Patent Number: 4,686,273

[45] Date of Patent: Aug. 11, 1987

[54] PROCESS FOR PREPARING MODIFIED POLY(ALKYLENE CARBONATE) POLYAHLS

[75] Inventor: Robert F. Harris, Midland, Mich.

[73] Assignee: The Dow Chemical Company, Midland, Mich.

[21] Appl. No.: 799,211

[22] Filed: Nov. 18, 1985

[51] Int. Cl.[4] .............................................. C08G 63/62
[52] U.S. Cl. .................................... 528/196; 525/462;
525/466; 525/467; 525/469; 528/271; 528/272;
528/309.1; 528/354; 528/370; 528/371;
528/405; 528/421; 558/262; 558/266; 558/268
[58] Field of Search ............... 525/462, 466, 467, 469;
525/468; 528/370, 196, 271, 272, 309, 405, 421;
558/262, 266, 268

[56] References Cited

U.S. PATENT DOCUMENTS

| | | | |
|---|---|---|---|
| 1,922,459 | 8/1933 | Schmidt et al. | 260/106 |
| 2,871,219 | 1/1959 | Baggett et al. | 260/45.95 |
| 2,891,073 | 6/1959 | Smith | 260/340.2 |
| 3,058,921 | 10/1962 | Pannell | 260/2 |
| 3,128,311 | 4/1964 | Shirley et al. | 260/585 |
| 3,133,113 | 5/1964 | Malkemus | 260/463 |
| 3,152,998 | 10/1964 | Moss | 252/170 |
| 3,248,414 | 4/1966 | Stevens | 260/463 |
| 3,248,415 | 4/1966 | Stevens | 260/463 |
| 3,248,416 | 4/1966 | Stevens | 260/463 |
| 3,313,782 | 4/1967 | Springmann et al. | 260/77.5 |
| 3,347,926 | 10/1967 | Zech | 260/585 |
| 3,379,693 | 4/1968 | Hostetler et al. | 260/725 |
| 3,654,370 | 4/1972 | Yeskey | 260/584 B |
| 3,689,462 | 9/1972 | Maximovich | 260/77.5 D |
| 3,896,090 | 7/1975 | Maximovich | 260/77.5 D |
| 4,014,933 | 3/1977 | Boettger et al. | 260/563 R |
| 4,105,641 | 8/1978 | Buysch et al. | 526/712 |
| 4,131,731 | 12/1978 | Lai et al. | 528/370 |
| 4,153,581 | 5/1979 | Habermann | 252/472 |
| 4,191,705 | 3/1980 | Lindner et al. | 260/463 |
| 4,431,754 | 2/1984 | Hoffmann | 521/137 |
| 4,460,715 | 7/1984 | Hoffmann et al. | 521/137 |
| 4,465,713 | 8/1984 | Lock et al. | 427/385.5 |
| 4,476,293 | 10/1984 | Robinson | 528/76 |

FOREIGN PATENT DOCUMENTS 898306  6/1962  United Kingdom .

OTHER PUBLICATIONS

*Journal of American Chemical Society,* vol. 49, 3181 (1927).
Kirk–Othmer, Encyclopedia of Chemical Technology, vol. 18, 3rd. Ed., pp. 624–625 and 638–640, published by Interscience publishers, Inc.

*Primary Examiner*—Theodore E. Pertilla

[57] ABSTRACT

The invention is a process for modifying and increasing the molecular weight of a poly(alkylene carbonate) polyahl, which comprises contacting the poly(alkylene carbonate) polyahl, with at least one modifier having a plurality of moieties that are reactive with the carbonate and/or acting hydrogen moieties of the poly(alkylene carbonate) polyahl at elevated temperatures and at a pressure at which at least one compound other than a monoalkylene glycol which compound is at least as volatile as a tetraethylene glycol is removed in the gaseous state from the poly(alkylene carbonate) polyahl.

71 Claims, No Drawings

PROCESS FOR PREPARING MODIFIED POLY(ALKYLENE CARBONATE) POLYAHLS

FIELD OF THE INVENTION

This invention relates to a method of modifying poly(alkylene carbonate) polyahls. The method may increase the molecular weight of poly(alkylene carbonate) polyahls.

BACKGROUND OF THE INVENTION

Poly(alkylene carbonate) polyahls are randomized, polymers containing alkylene carbonate moieties and optionally ether moieties such as di- and higher polyalkylenoxy units. Poly(alkylene carbonate) polyahls are useful in preparing polyurethanes, and as adhesives and surfactants.

Polyether polyols and polyester polyols are well-known polymers which can be further polymerized with organic polyisocyanates to prepare polyurethanes. Polyether polyols are prepared by the reaction of hydroxy-containing hydrocarbons, such as an aromatic or aliphatic diol, and epoxides, for instance ethylene oxide and propylene oxide. Polyester polyols are prepared by the reaction of polyacids, such as adipic or terephthalic acid, or esters of polyacids, such as dimethyl adipate or dimethyl terephthalate with dihydroxy-containing hydrocarbons, such as aromatic and aliphatic diols. Some poly(alkylene carbonate) polyol properties resemble polyester polyol properties, while other properties resemble polyether polyols.

It is known to prepare polycarbonates from aliphatic dihydroxyl compounds either by a process of phosgenation in which hydrogen chloride is liberated or bound by bases, such as pyridine or quinoline, or by a process of transesterification with carbonic acid esters of alcohols or phenols, preferably diphenylcarbonate, optionally with the aid of transesterification catalysts. In either case, it is essential to use phosgene or a mixture of carbon monoxide and chlorine as source of carbonic acid. Commercial processes which involve the preparation and handling of phosgene are difficult and costly because of the considerable safety risks involved and the high cost of materials due to corrosion. To this are added ecological problems, since either the spent air is contaminated with hydrogen chloride or the effluent water with sodium chloride.

Polycarbonates produced by these methods, using dihydrocarbyl compounds, may have a functionality of less than two due to inadequate or incomplete esterification or transesterification, which often prevents the products from forming high molecular weight polymers in subsequent reactions.

Stevens (in U.S. Pat. Nos. 3,248,414; 3,248,415; and 3,248,416) discloses the preparation of poly(alkylene carbonate) polyols from (1) carbon dioxide and 1,2-epoxides; (2) cyclic carbonates such as ethylene carbonate; or (3) cyclic carbonates and a 1,2-epoxide. A minor amount of a polyol is employed as an initiator. The reaction is usually conducted in the presence of a metal carbonate, metal hydroxide, trisodium phosphate, or tertiary amine.

Poly(alkylene carbonate) polyols have also been prepared by polymerization of ethylene carbonates using basic catalysts and a minor amount of glycol as initiator, Buysch et al. (U.S. Pat No. 4,105,641). These products are low in carbonate and high in ether groups concentration due to decomposition of the ethylene carbonate.

In Stevens' patents discussed hereinbefore, the patentees exposed a poly(alkylene carbonate) polyol derived from ethylene carbonate and monoethylene glycol to temperatures of 160° C. at 2 mm Hg pressure to remove unreacted ethylene carbonate. Hostetler (U.S. Pat. No. 3,379,693) removed unreacted ethylene carbonate from products similar to poly(alkylene carbonate) polyols by heating them to about 130° C. under 1–5 mm Hg. Maximovich (U.S. Pat. No. 3,896,090) reacted ethylene carbonate with diethylene glycol and treated the reaction product under reduced pressure to remove the unreacted ethylene carbonate and diethylene glycol.

Several workers have prepared poly(alkylene carbonate) polyols and related materials by controlling an equilibrium between the reaction materials of a diol and alkylene carbonate and the products of a poly(alkylene carbonate) polyol and monoethylene glycol. The reaction is controlled by the removal of monoethylene glycol.

Malkemus (U.S. Pat. No. 3,133,113) reacted ethylene carbonate and diethylene glycol at 125° C. to 130° C. under reduced pressure of 10 mm Hg with concurrent removal of monoethylene glycol as distillate. This was followed by removal of starting material. This process requires large excesses of ethylene carbonate. This procedure is plagued by the presence of volatile ethylene carbonate, which condenses as a solid through the system, causing severe plugging and reducing ethylene carbonate conversion while monoethylene glycol is being removed.

Springmann et al. (U.S. Pat. No. 3,313,782) further studied this process under reduced pressure in the presence of catalysts and set limits on the reaction conditions; the reaction temperatures must be lower than the boiling point of the alkylene carbonate, but high enough to distill off the monoethylene glycol formed.

Lai et al. (U.S. Pat. No. 4,131,731) used staged reductions in pressure during the reaction of alkylene carbonate with a diol, wherein the final stage was to remove monoethylene glycol. The patentees characterized their reaction conditions by stating that the alkylene carbonate must have a boiling point 4.9° C. greater than monoethylene glycol. The chemistry based on the above equilibrium was improved by Buysch et al. (U.S. Pat. No. 4,105,641) by carrying out the reactions in a solvent (e.g., cumene) capable of removing monoethylene glycol as an azeotrope with the solvent.

Until recently, the molecular weights of poly(alkylene carbonate) polyols from alkylene carbonates have been controlled by either the stoichiometry of the reactants (that is, higher alkylene carbonate to initiator ratios for higher molecular weights) or the removal of monoethylene glycol from the reaction mixture wherein an ethylene carbonate to initiator equivalent ratio of about 1 is used. Catalysts are used in most cases, as reaction rates are very slow in the absence of a catalyst. When high alkylene carbonate to initiator ratios are used to make higher molecular weight poly(alkylene carbonate) polyols, reaction rates drop severely as higher conversions are approached: long reaction times are required and the products are contaminated by unreacted alkylene carbonate. If temperatures are increased to increase the rate, product decomposition occurs with $CO_2$ loss. However, in the process of co-pending application Ser. No. 750,362, filed July 1, 1985 and incorporated herein by reference, rates of molecular weight build up are rapid without $CO_2$ loss. Prior to copending application Ser. No. 750,362, the choice of the ratio of starting reactants and catalysts resulted in an upper limit on the molecular weight of the poly(alkylene carbonate) polyol which could be prepared. Furthermore, the products of such processes are of relatively low molecular weight and have a broad molecular weight range; that is, they have a high poly-dispersity index and are often contaminated with unreacted starting materials and relatively low molecular weight reaction intermediates. Furthermore, the particular reactant ratio and catalyst used have a significant effect on the amount of alkylene carbonate moieties in the backbone of the chain.

A process for preparing higher molecular weight poly(alkylene carbonate) polyols beyond the limitations imposed by the stoichiometry and catalyst used at reasonable reaction rates and free of low molecular weight contaminants is disclosed in copending application Ser. No. 750,362, filed July 1, 1985. What is needed is a process for preparing higher molecular weight poly(alkylene carbonate) polyahls which are modified by the incorporation of other materials chemically bound into the polymer backbone. The introduction of a modifier allows adjustment of the physical and chemical properties of the poly(alkylene carbonate) polyahl prepared by the present process to maximize its effectiveness in specific applications. Modifiers can be materials such as polyahls which can react with the carbonate moieties of poly(alkylene carbonate) polyahls or they can be materials such as poly acids, polyesters or cyclic anhydrides which can react with the active hydrogen moieties (ahl) of poly(alkylene carbonate) polyahls. Some modifiers could be reactive toward both moieties.

As defined, for example, in U.S. Pat. No. 4,431,754 a polyahl is any polyfunctional compound having more than 1 active hydrogen moiety.

SUMMARY OF THE INVENTION

The invention is a process for modifying a poly(alkylene carbonate) polyahl to increase the molecular weight of a poly(alkylene carbonate) polyahl which comprises contacting the poly(alkylene carbonate) polyahl with at least one modifier having a plurality of moieties that are reactive (hereinafter called reactive moieties) with the carbonate and/or active hydrogen moieties (hereinafter collectively called active moieties) of the poly(alkylene carbonate) polyahl at elevated temperature and at a pressure at which at least one compound other than a monoalkylene glycol which compound is at least as volatile as a tetraethylene glycol is removed in the gaseous state from the poly(alkylene carbonate) polyahl under conditions such that the molecular weight of the poly(alkylene carbonate) polyahl is increased and the poly(alkylene carbonate) polyahl backbone or side chain is modified by reaction with the modifier.

In the process of the present invention, poly(alkylene carbonate) polyahls prepared by other processes, may be modified by the incorporation of any polyfunctional material which can react with the carbonate and/or the active hydrogen moieties of the poly(alkylene carbonate) polyahls. This process allows the preparation of higher molecular weight modified poly(alkylene carbonate) polyahls at faster rates and higher purity than previously prepared as well as the preparation of a variety of novel products.

Furthermore, the process of the present invention permits the preparation of poly(alkylene carbonate) polyahls with varying degrees of molecular weight or structure. The introduction of a modifier allows adjustment of the physical and chemical properties of the poly(alkylene carbonate) polyahl prepared by the present process to maximize its effectiveness in specific applications. For example, this process should be useful for producing materials for applications in flexible urethane foams, rigid urethane foams, urethane/urea elastomers and plastics, adhesives, functional fluids, and surfactants among others.

DETAILED DESCRIPTION OF THE INVENTION

The starting materials in the process of this invention are poly(alkylene carbonate) polyahls, and polyfunctional materials reactive with poly(alkylene carbonate) polyahls as defined hereinafter. Poly(alkylene carbonate) polyahls are randomized polymers having a plurality of carbonate moieties and a plurality of active hydrogen moieties and optionally other moieties such as di- and higher polyalkyleneoxy units. An alkylene carbonate moiety is a repeating unit which has an alkylene group bound to a carbonate moiety. An active hydrogen moiety is a moiety containing a hydrogen atom which because of its position in the moiety displays significant activity according to the Zerewitnoff test described by Kohler in the *Journal of Americal Chemical Society*, Vol. 49, 3181 (1927). Illustrative of such active hydrogen moieties are —COOH, —OH, —NH$_2$, —NH—, —CONH$_2$, —SH and —CONH—. Alkyleneoxy moiety refers herein to a repeating unit which has an alkylene group bound to an oxygen. Alkylene carbonate and alkyleneoxy moieties are respectively represented by the following formulae:

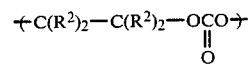

and

wherein R$^2$ is as hereinafter defined. A dialkylene glycol refers herein to 2 alkylene moieties connected by an oxygen and terminated by an hydroxyl group, wherein the alkylene moieties can be substituted with a hydrocarbyl moiety. Preferred dialkylene glycol moieties correspond to the formula

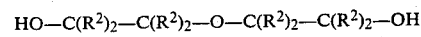

wherein R$^2$ is as hereinafter defined. Examples of preferred dialkylene glycols include dipropylene glycol, diethylene glycol, 1,2-dibutylene glycol, 2,3-dibutylene glycol, and the like.

Preferred poly(alkylene carbonate) polyahls are random polyols represented by the formula:

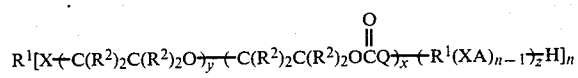

wherein
R$^1$ is separately in each occurrence an n-valent hydrocarbon radical or hydrocarbon radical which can contain one or more heteroatoms of O, N or S;

$R^2$ is separately in each occurrence hydrogen, halogen, a nitro group, a cyano group, a $C_{1-20}$ hydrocarbyl group or a $C_{1-20}$ hydrocarbyl group substituted with one or more of the following: a halo, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsufinyl, arylsulfinyl, aralkylsulfinyl, alkylsulfonyl, arylsulfonyl, or aralkylsulfonyl group;

X is separately in each occurrence S, O, NH,

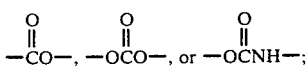

A is separately in each occurrence $+C(R^2)_2C(R^2)_2-OCQ+_x$, $+C(R^2)_2C(R^2)_2O+_y$ or combinations thereof or a covalent bond;

Q is separately in each occurrence O, S or NH provided that all carbonate moieties are internal because terminal carbonate moieties are unstable and form OH moieties by the elimination of $CO_2$;

n is separately in each occurrence an integer of from 1 to 25;

x is separately in each occurrence an integer of from 1 to 40;

y is separately in each occurrence an integer of from 1 to 120; and z is separately in each occurrence an integer of from 0 to 5.

A more preferred class of poly(alkylene carbonate) polyahls are poly(alkylene carbonate) polyols generally corresponding to the aforementioned formula wherein $R^1$, $R^2$, and n are as previously defined; X is oxygen; x is separately in each occurrence an integer of from 2 to 10; y is separately in each occurrence an integer of from 5 to 15 and z is an integer of from 0 to 2; provided that the ratio of y to x is from 1:1 to 3:1.

In the hereinbefore-defined formulas, $R^1$ is preferably an aliphatic or cycloaliphatic hydrocarbon containing one or more oxygen, nitrogen or sulfur moieties; $R^1$ is more preferably an n valent alkane or cycloalkene, or an n valent or cycloalkane containing one or more oxygen, nitrogen or sulfur moieties; $R^1$ is even more preferably an n valent $C_{1-10}$ alkane or an n valent $C_{1-10}$ alkane substituted with one or more oxygen moieties. $R^2$ is preferably hydrogen, $C_{1-20}$ alkyl, $C_{1-20}$ haloalkyl, $C_{1-20}$ alkenyl or phenyl; $R^2$ is more preferably hydrogen, $C_{1-3}$ alkyl, $C_{2-3}$ alkenyl, or phenyl; $R^2$ is even more preferably hydrogen, methyl or ethyl; $R^2$ is even more preferably hydrogen or methyl, and, most preferably, hydrogen. X is preferably S, O or NH; X is most preferably O. Preferably, n is an integer of 1 to 10, inclusive; more preferably, 1 to 5, inclusive; and, most preferably, 1 or 2.

As used herein, the term "polyahl" includes any polyfunctional compound having an average more than 1 active hydrogen moiety is defined hereinbefore. Specifically included within the definition of polyahl are polyols, polyamines, polyamides, polymercaptans and polyacids. Examples of polyahls suitable for use in the instant invention may be found in U.S. Pat. No. 4,465,713 at column 2, line 42 through column 5, line 17.

Poly(alkylene carbonate) polyahl starting materials useful in this invention are prepared by any method known in the art, such as the condensation of an alkylene carbonate, carbon dioxide and an alkylene oxide, or mixtures of an alkylene carbonate, an alkylene oxide and/or $CO_2$, with organic compound containing one or more active hydrogen atoms (initiator) in the presence of an alkaline catalyst or metal salt of an alkaline compound. Examples of these poly(alkylene carbonate) polyols and methods for preparation of these polyols are contained in Maximovich (U.S. Pat. No. 3,896,090), Maximovich (U.S. Pat. No. 3,689,462), Springmann (U.S. Pat. No. 3,313,782), Stevens (U.S. Pat. No. 3,248,416), Stevens (U.S. Pat. No. 3,248,415), and Stevens (U.S. Pat. No. 3,248,414) and copending application Ser. No. 750,362, all incorporated herein by reference. Alternatively, the poly(alkylene carbonate) polyols can be prepared by reacting a dialkyl carbonate or diaryl with an initiator with two or more hydroxyl moieties. See, for example, U.S. Pat. No. 4,476,293 and U.S. Pat. No. 4,191,705, incorporated herein by reference.

The poly(alkylene carbonate) polyahls used as starting materials may also contain the residue of an initiator as well as unreacted starting materials and other relatively volatile reaction products.

It is preferred to remove the catalysts used to prepare the starting poly(alkylene carbonate) polyahls prior to the performance of the present process, as such catalysts can result in the decomposition of the poly(alkynene carbonate) polyahls at the temperatures used in this process. While trace amounts of such catalysts can be present without significant decomposition, the bulk of the catalyst used to prepare the starting poly(alkylene carbonate) polyahls is removed prior to the advancement process of this invention. The combination of short reaction times in the presence of very low catalyst levels allows high molecular weight build with minimal decomposition.

The organic compounds which function suitably as modifiers in the practice of this invention are polyfunctional materials which are reactive with the carbonate and/or active hydrogen moieties of poly(alkylene carbonate) polyahls.

Most polyahls are reactive with the carbonate moieties of poly(alkylene carbonate) polyahls. Typical polyahls include polyols, polyamines, polyamides, polymercaptans and polyacids.

Of the foregoing polyahls, the polyols are preferred. Examples of such polyols are the polyol polyethers, the polyol polyesters, hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers including polythioethers, acetals including polyacetals, aliphatic and aromatic polyols and thiols including polythiols, amines including aromatic, aliphatic and heterocyclic amines including polyamines as well as mixtures thereof. Alkylene oxide adducts of compounds which contain two or more different groups within the above-defined classes may also be used such as amino alcohols which contain an amino group and a hydroxyl group. Also alkylene adducts of compounds which contain one —SH group and one —OH group, as well as those which contain an amino group and a —SH group, may be used.

Polyether polyols which are most advantageously employed as the polyahl in the practice of this invention are the polyalkylene polyether polyols including the polymerization products of alkylene oxides and other oxiranes with water or polyhydric alcohols having from two to eight hydroxyl groups. Exemplary alcohols that are advantageously employed in making the polyether polyol include ethylene glycol, 1,3-propylene glycol, 1,2-propylene glycol, 1,4-butylene glycol, 1,3-butylene glycol, 1,2-butylene glycol, 1,5-pentane diol, 1,7-heptane diol, glycerol, 1,1,1-trimethylolpropane, 1,1,1-trimethylolethane, hexane-1,2,6-triol, α-methyl glucoside, pentaerythritol, erythritol, pentatols and hexatols. Also included within the term "polyhydric alcohol" are sugars such as glucose, sucrose, fructose and maltose as well as compounds derived from phenols such as 2,2-(4,4'-hydroxyphenyl)propane, commonly known as bisphenol A. Illustrative oxiranes that are advantageously employed in the preparation of the polyether polyol include simple alkylene oxides such as ethylene oxide, propylene oxide, butylene oxide, and amylene oxide; glycidyl ethers such as t-butyl glycidyl ether and phenyl glycidyl ether; and random or block copolymers of two or more of these oxiranes. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have primary, secondary or tertiary hydroxyl groups and, preferably, are polyethers prepared from alkylene oxides having from two to six carbon atoms such as ethylene oxide, propylene oxide and butylene oxide. The polyalkylene polyether polyols may be prepared by any known process such as, for example, the process disclosed by Wurtz in 1859, and Kirk-Othmer, Encyclopedia of Chemical Technology, Vol. 18, 3rd. Ed., pp. 624–625 and 638–640, or in U.S. Pat No. 1,922,459. Also suitable are polyether polyols and processes for preparing them that are described in Schick, M. J., *Nonionic Surfactants*, Marcel Dekker, Inc., New York (1967), U.S. Pat. Nos. 2,891,073; 3,058,921; 2,871,219 and British Pat. No. 898,306. Polyether polyols which are most preferred include the alkylene oxide addition products of water, trimethylolpropane, glycerine, pentaerythritol, sucrose, sorbitol, ethylene glycol, propylene glycol, butylene glycol and blends thereof having hydroxyl equivalent weights of from about 100 to about 5000.

Examples of preferred hydroxy-containing polyesters include those obtained from polycarboxylic acids and polyhydric alcohols. Examples of suitable polycarboxylic acids include oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, β-butyl-β-ethyl-glutaric acid, α,β-diethylsuccinic acid, isophthalic acid, terephthalic acid, hemimellitic acid, and 1,4-cyclohexanedicarboxylic acid. Any suitable polyhydric alcohol including both aliphatic and aromatic may be used such as ethylene glycol, diethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol and sorbitol. Also included with the term "polyhydric alcohol" are compounds derived from phenols such as 2,2-(4,4'-hydroxyphenyl)propane, commonly known as bisphenol A, bis(4,4'-hydroxyphenyl)sulfide and bis(4,4-hydroxyphenyl)sulfone.

Amines which are optionally reacted with alkylene oxides and other oxiranes form amine-initiated polyols which are suitable modifiers include aromatic amines such as aniline, o-chloroaniline, p-amino aniline, 1-5,diamino naphthalene, methylene dianiline, the condensation products of aniline and formaldehyde and 2,4-diamino toluene; aliphatic amines such as methylamine, triisopropanolamine, isopropanolamine, diisopropanolamine, ethylenediamine, 1,3-propylenediamine, 1,4-butylenediamine and 1,3-butylenediamine, mixtures thereof and the like.

A variety of amines can function as the modifier. Any polyfunctional amino compound can be used that is less volatile than the dialkylene glycol, trialkylene glycol or initiator molecule that is being removed during molecular weight advancement. A preferred class of polyamines are those prepared by the reductive amination of polyols. Examples of such polyamines can be found in U.S. Pat. Nos. 3,128,311; 3,152,998; 3,347,926; 3,654,370; 4,014,933 and 4,153,581.

Polyahls containing two or more functional groups are also operative modifiers in this process. These include amino acids such as 6-amino caproic acid, 12-amino-dodecanoic acid, p-aminophenylacetic acid, 11-amino-undecanoic acid, 5-aminovaleric acid and the like. Also included are amino alcohols, mercapto alcohols, hydroxy acids, mercapto acids and the like.

Some polyahls suitable as modifiers are also reactive with the active hydrogen moieties of poly(alkylene carbonate) polyahls. Poly acids such as aromatic and aliphatic polycarboxylic acids and polysulfonic and sulfinic acids are in this class of compounds. Polymers and copolymers containing acid-functional moieties are also operable. Other polyahls suitable as modifiers are described in U.S. Pat. No. 4,460,715.

The modifier can also be materials other than polyahls which are reactive with the active hydrogen moieties of poly(alkylene carbonate) polyahls. The cyclic anhydrides are one class of such materials. Examples include succinic anhydride, maleic anhydride, phthalic anhydride, bromomaleic anhydride, dichloromaleic anhydride, dimethylmaleic anhydride, dimethylsuccinic anhydride, 2-dodecen-1-yl succinic anhydride, glutaric anhydride, heptanoic anhydride, hexanoic anhydride, homophthalic anhydride, 3-methylglutaric anhydride, methylsuccinic anhydride, 2-phenylglutaric anhydride, pyromellitic dianhydride and the like. Cyclic anhydrides can contain other functional groups which are reactive with poly(alkylene carbonate) polyahls such as hydroxyl and carboyxlic acid groups.

Another class of modifiers that are reactive with the active hydrogen moieties of poly(alkylene carbonate) polyahls are polyesters. Preferred polyesters are those formed from the lower alcohols of polycarboxylic acids. Examples include the esters from alcohols containing 1 to 8 carbon atoms with polyfunctional acids such as maleic acid succinic acid, glutaric acid, adipic acid, pimelic acid, suberic acid, azelaic acid, maleic acid, fumaric acid, terephthalic acid, isophthalic acid, 1,4-cyclohexane dicarboxylic acid and the like. The only requirement is that the alcoholic portion of the polyester is volatile under the conditions of the instant process.

The process of the present invention preferably involves (1) contacting a poly(alkylene carbonate) polyahl with a modifier, e.g., a different polyahl and/or a compound reactive with the active hydrogen moieties of the poly(alkylene carbonate) polyahl, under elevated temperature and reduced pressure to split off a dialkylene glycol, a trialkylene glycol, a tetraalkylene glycol and/or a moiety which is volatile under the reaction conditions, preferably as volatile as or more volatile than the dialkylene glycol, trialkylene glycol, or tetraalkylene glycol, and (2) removing such volatile components from the reaction mass thereby causing the advancement of the molecular weight of the poly(alkylene carbonate) polyahl. It is understood that combinations, i.e., mixtures, of two or more modifiers can be employed with one or a mixture of two or more poly(alkylene carbonate) polyahls in the process of this invention. The amount of modifier employed is suitably any amount which provides the desired modification of the poly(alkylene carbonate) polyahl. Preferably, however, the amount of modifier employed is from about 0.1 to about 3, more preferably from about 0.25 to about 2, most preferably from about 0.5 to about 1.5, equivalent of reactive moieties of the modifier per equivalent of active moieties of the poly(alkylene carbonate) polyahl wherein a reactive moiety of the modifier is a group reactive with carbonate or active hydrogen moieties of the poly(alkylene carbonate) polyahl and the active groups of the poly(alkylene carbonate) polyahl are the active hydrogen moieties and the carbonate moieties.

Generally, the dialkylene glycol and/or initiator will volatilize very readily under almost all conditions. At lower degrees of rectification and at lower carbonate content, less volatile components such as the trialkylene glycols, tetraalkylene glycols and higher alkylene glycols may come off. If the poly(alkylene carbonate) polyahl starting material contains no dialkylene glycol units, the trialkylene glycol units can be removed by this process. In general, the lightest fraction which splits from the starting material will be removed. In those embodiments wherein the poly(alkylene carbonate) polyahl is a monofunctional species, that is, where the initiator has only one active hydrogen site, under certain circumstances the initiator fragment may be more volatile than the dialkylene glycol fragment and therefore will split off and be removed more readily than the dialkylene glycol portion. When the initiator is a linear $C_{1-8}$ alcohol, the $C_{1-8}$ alcohol fragment will be removed before the dialkylene glycol fragments will be removed. Where a linear $C_{10}$ or $C_{11}$ alcohol is used as the initiator, the linear $C_{10}$ or $C_{11}$ alcohol is about as volatile as the dialkylene glycol and therefore should come off at the same time. Where a linear $C_{12}$ or greater alcohol is the initiator, the dialkylene glycol is more volatile and will split off and be removed first. Branched alcohol initiators or polyols have somewhat different volatilities and will be split out based on their relative volatility as compared to the dialkylene or trialkylene glycol fragment. When a polyfunctional material which is reactive with the active hydrogen moieties of a poly(alkylene carbonate) polyahl is used as the modifier, additional volatile components such as water and lower alcohols can be removed.

Since in the process of this invention, a modifier is added to a poly(alkylene carbonate) polyahl and the resultant mixture is subjected to heating at reduce pressure with the removal of diethylene glycol (and/or other volatile components) and since the modifier is not chemically bound to the poly(alkylene carbonate) polyahl at the beginning of the reaction and further since the modifier is in many cases not even compatible (present as a separate phase) with the poly(alkylene carbonate) polyahl at the beginning of the reaction, the relative volatilities of the modifier and the molecules being removed to drive the advancement reactions are very important.

The volatile component can be removed by any method known in the art. Such methods include fractional distillation, fractionation, passing an inert gas over the reaction mass so as to remove the volatile species, and any other method for removing the volatile species as is known in the art—for example, a falling film still such as a wiped film evaporator is particularly useful. A preferred method of condensing the distillate is by the use of a water-chilled condenser. The majority of the very volatile components present such as acetone and water, both introduced during catalyst removal, and dioxane, small quantities of which can be present due to decomposition, pass through the water-chilled condenser under the reduced pressure conditions employed, and can be condensed using a dry ice condenser. The volatile species condensed by the water-chilled condenser can be recycled to be used as initiators for the preparation of poly(alkylene carbonate) polyahls useful as starting materials in this process.

The process of the present invention takes place at any temperature at which the splitting off of the volatile segments occurs. The lower temperature limit is that temperature at which the splitting of the volatile component occurs, and the upper limit is that temperature at which the poly(alkylene carbonate) polyahl or modified poly(alkylene carbonate) polyahl undergoes decomposition. Preferred temperatures are between about 150° C. and 300° C. More preferred temperatures are between about 175° C. and 260° C., with between about 200° C. and 250° C. being most preferred.

Pressures used in this process are those pressures at which the dialkylene glycol or materials that can be volatilized at the temperatures used in the reaction. Preferably, pressures are atmospheric and subatmospheric, with subatmospheric pressures being more preferable. More preferable pressures are less than about 300 mm Hg; even more preferably, less than about 100 mm Hg; even more preferably, less than about 50 mm Hg; and, most preferably, between 1 and 30 mm Hg, especially about 10 mm Hg.

The reaction time for the process of this invention is variable depending on various factors, including temperature, pressure, and the molecular weight of the desired product. At lower pressures, and higher temperatures, the time to achieve the desired molecular weight is lower. The process can be run for a time sufficient to give the desired molecular weight. Reaction times are relatively rapid: only a few hours are required in most cases.

The process of this invention is generally performed by exposing the poly(alkylene carbonate) polyahl in neat form, and the modifier, i.e., a polyahl or a polyfunctional material reactive with the active hydrogen moieties of the poly(alkylene carbonate) polyahl to the processing conditions. The process can be performed in a solvent, although performing the process in neat form is preferred. Solvents useful include (1) inert organic solvents with a boiling point above that of the dialkylene glycol or the most volatile species, or (2) solvents which remove the dialkylene glycol by azeotropic distillation.

The products of the process of the present invention are modified poly(alkylene carbonate) polyahls with higher molecular weights than the starting poly(alkylene carbonate) polyahls. The molecular weights of the poly(alkylene carbonate) polyahls prepared by the present process can be any molecular weight desired which is above the starting molecular weight. Preferable molecular weights ($\overline{M}_n$) are between about 500 and 10,000, with most preferred molecular weights being between 1,000 and 8,000.

SPECIFIC EMBODIMENTS

The following examples are included for illustrative purposes only, and are not intended to limit the scope of the invention or the claims. Unless otherwise stated, all parts and percentages are by weight.

The molecular weights and distribution are determined by size exclusion chromatography (SEC) on Waters Ultrastyragel ® 1000 Å and 10,000 Å columns in series using tetrahydrofuran (THF) as the mobile phase and calibrated with narrow molecular weight poly(ethylene glycol) standards. In measuring molecular weight by the end group hydroxyl titration technique, the poly(alkylene carbonate) polyol is reacted with excess phthalic anhydride in pyridine. The unreacted anhydride is determined by titration with 0.5M NaOH. For purposes of this invention $\overline{M}_n$ refers to number average molecular weight, $\overline{M}_w$ refers to weight average molecular weight, Peak refers to molecular weight at the peak of the molecular weight curve, PDI refers to polydispersity index and is equal to $\overline{M}_w/\overline{M}_n$.

EXAMPLE 1

A low molecular weight ($\overline{M}_n$ of 607) poly(ethylene carbonate) polyol (36.8 g) prepared from 10 moles of ethylene carbonate and one mole of diethylene glycol and P-400 (8.0 g, a poly(propylene glycol) with a molecular weight of 400) and boiling stones (0.1 g) are combined in a 50 ml, 3-necked boiling flask equipped with a thermometer, temperature controller, stopper (for sampling) and a short path distillation head attached to a controlled vacuum source. Under a reduced pressure of 30 mm Hg, the mixture (two phases before reaction) is heated to a reactor temperature of 232° C. (3 hrs. total) during which time 4.7 g of distillate (90% DEG) is removed overhead. The residue is a yellow, viscous oil representing 79 wt % (35.4 g) of the sample charged and contains 22.8% $CO_2$ (by NMR) and 20.4 wt % P-400 (chemically bound into polymer backbone). The molecular weight is determined by SEC:

| Ad-vanced | Wt % Residue | Wt % $CO_2$ | Wt % P-400 | Molecular Wt. | | | |
|---|---|---|---|---|---|---|---|
| | | | | Peak | $\overline{M}_n$ | $\overline{M}_w$ | PDI |
| No.* | — | 27.8 | — | 981 | 607 | 1103 | 1.82 |
| Yes** | 79.0 | 22.8 | 20.4 | 3044 | 1286 | 3207 | 2.49 |

*The poly(ethylene carbonate) polyol is not an advanced polymer; thus, its $M_n$ is 607 which is that of the starting material.
**Poly(ethylene carbonate) polyol after modification and molecular weight advancement.

The example shows that P-400 can be incorporated into the backbone of a poly(alkylene carbonate) polyol at the 20.4% level.

EXAMPLE 2

The low molecular weight poly(alkylene carbonate) polyol (41.2 g) used in Example 1, glycerine (2.10 g) and boiling stones (0.1 g) are combined in the same equipment used in Example 1 above. Under a reduced pressure of 10 mm Hg, the mixture is heated to a reactor temperature of 209° C. (3½ hrs. total) during which time 9.3 g of distillate (75% DEG) is removed overhead. The residue is a straw-colored, viscous oil and contains 29.1 wt % $CO_2$ (by NMR). The molecular weight is determined by SEC:

| Ad-vanced | Wt % Residue | Wt % $CO_2$ | Molecular Wt. | | | |
|---|---|---|---|---|---|---|
| | | | Peak | $\overline{M}_n$ | $\overline{M}_w$ | PDI |
| No | — | 27.8 | 981 | 607 | 1103 | 1.82 |
| Yes | 72.1 | 29.1 | 2721 | 1212 | 2621 | 2.16 |

The example shows that glycerine can be incorporated into the backbone of a poly(alkylene carbonate) polyol.

EXAMPLE 3

A low molecular weight ($\overline{M}_n$ of 603) poly(ethylene carbonate) polyol (425.0 g), P-400 (100.0 g) and boiling stones (0.2 g) are combined in a 500 ml, 3 necked boiling flask equipped with a thermometer, temperature controller and a down draft water-chilled condenser attached to a vacuum source through a dry ice-isopropanol trap (about −78° C.). The contents of the flask are heated to a pot temperature of 235° C. over a period of 2.5 hours at 10 mm Hg vacuum. The distillate collected in the water-chilled condenser accounts for 19.5 wt % (102.6 g) of the sample charged and has the following assay: density of 1.12, 0.35 wt % monoethylene glycol, 0.66 wt % dioxane, 7.93 wt % ethylene carbonate, 79.8 wt % diethylene glycol, 7.67 wt % triethylene glycol, 0.35 wt % tetraethylene glycol and 0.06 wt % water (total 96.7 wt %). The distillate collected at −78° C. accounts for 4.2 wt % (21.9 g) of the sample charged and has the following assay: 60.7 wt % acetone, 21.7 wt % dioxane and 13.0 wt % water (total 95.5 wt %). The residue is a light amber, viscous liquid containing 25.2 wt % P-400, 23.2 wt % $CO_2$, represents 75.7 wt % (397.6 g) of the sample charged and has the properties shown on Table 1. The $\overline{M}_n$ by end group (OH) titration is 2466.

TABLE 1

| Advanced | Wt % Residue | Wt % $CO_2$ | Viscosity (cps)[1] | | | Molecular Wt. | | | |
|---|---|---|---|---|---|---|---|---|---|
| | | | 25° | 50° C. | 90° C. | Peak | $\overline{M}_n$ | $\overline{M}_w$ | PDI |
| No | — | 21.7 | 980 | 185 | 37 | 950 | 603 | 1080 | 1.79 |
| Yes | 75.7 | 23.2 | 68,000 | 8800 | 1100 | 4356 | 2317 | 5481 | 2.37 |

[1]Viscosity in centipoise is determined on Haake Rotoviscometer on neat poly(ethylene carbonate) polyol.

This example shows that P-400 can be incorporated into the backbone of a poly(alkylene carbonate) polyol at the 25.2 wt % level.

EXAMPLE 4

The low molecular weight poly(alkylene carbonate) polyol (318.0 g) used in Example 3, P-400 (207.5 g) and boiling stones (0.2 g) are combined in the same equipment as used in Example 3. The contents of the flask are heated to a pot temperature of 235° C. over a period of 3 hours at 10 mm Hg vacuum. The distillate collected in the water-chilled condenser accounts for 21.1 wt %

(110.7 g) of the sample charged and has the following assay: density 1.12, 0.32 wt % monoethylene glycol, 0.64 wt % dioxane, 4.82 wt % ethylene carbonate, 79.5 wt % diethylene glycol, 8.2 wt % triethylene glycol, 0.12 wt % tetraethylene glycol and 0.04 wt % water (total 93.6 wt %). The distillate collected at −78° C. accounts for 3.2 wt % (16.7 g) of the sample charged and has the following assay: 56.6 wt % acetone, 19.4 wt % dioxane and 19.3 wt % water (total 95.3 wt %). The residue is a light amber, viscous liquid containing 52.2 wt % P-400, 15.3 wt % $CO_2$, represents 75.7 wt % (397.7 g) of the sample charged and has the properties shown on Table 2. The $\overline{M}_n$ by end group (OH) titration is 2231.

This example shows that a polyester polyol can be incorporated into the backbone of a poly(alkylene carbonate) polyol at the 47.2 wt % level.

EXAMPLE 6

The low molecular weight poly(ethylene carbonate) polyol (425.0 g) used in Example 3, P-725 (100.0 g, a poly(propylene glycol) with a $\overline{M}_n$ of 725) and boiling stones (0.2 g) are combined in the same equipment as used in Example 3. The contents of the flask are heated to a pot temperature of 225° C. over a period of 2.5 hours at 10 mm Hg vacuum. The distillate collected in the water-chilled condenser accounts for 15.5 wt % (81.6 g) of the sample charged and has the following

TABLE 2

| Advanced | Wt % Residue | Wt % $CO_2$ | Viscosity (cps)[1] | | | Molecular Wt. | | | |
|---|---|---|---|---|---|---|---|---|---|
| | | | 25° | 50° C. | 90° C. | Peak | $\overline{M}_n$ | $\overline{M}_w$ | PDI |
| No | — | 21.7 | 980 | 185 | 37 | 950 | 603 | 1080 | 1.79 |
| Yes | 75.7 | 15.3 | 16,000 | 3450 | 380 | 4356 | 2002 | 4830 | 2.41 |

[1]Same as 1 in Table 1.

This example shows that P-400 can be incorporated into the backbone of a poly(alkylene carbonate) polyol at the 52.2 wt % level.

EXAMPLE 5

A low molecular weight ($\overline{M}_n$ of 638) poly(ethylene carbonate) polyol (309.1 g), Formrez® 11-225 (190.0 g, a hydroxyl functional diethylene glycol adipate, $\overline{M}_n$ of 500, manufactured by Witco Chemical Company) and boiling stones (0.2 g) are combined in the same equipment as used in Example 3. The contents of the flask are heated to a pot temperature of 230° C. over a period of 2 hours at 10 mm Hg vacuum. The distillate collected in the water-chilled condenser accounts for 16.6 wt % (82.8 g) of the sample charged and has the following assay: density 1.12, 0.40 wt % monoethylene glycol, 0.29 wt % dioxane, 8.87 wt % ethylene carbonate, 76.0 wt % diethylene glycol, 7.29 wt % triethylene glycol, 0.46 wt % tetraethylene glycol, 0.04 wt % water (total 93.3 wt %). The distillate collected at −78° C. accounts for 2.4 wt % (12.2 g) of the sample charged and has the following assay: 83.6 wt % acetone, 9.21 wt % dioxane and 1.6 wt % water (total 94.4 wt %). The residue is a light straw, viscous liquid representing 80.7 wt % (402.5 g) of the sample charged, contains 47.2 wt % Formrez® 11-225, 22.0 wt % $CO_2$ and has the properties shown on Table 3. The $\overline{M}_n$ by end group (OH) titration is 1777.

assay: density 1.13, 0.72 wt % monoethylene glycol, 0.76 wt % dioxane, 9.19 wt % ethylene carbonate, 79.8 wt % diethylene glycol, 6.51 wt % triethylene glycol, 0.08 wt % water (total 97.0 wt %). The distillate collected at −78° C. accounts for 4.1 wt % (21.3 g) of the sample charged and has the following assay: 63.6 wt % acetone, 18.8 wt % dioxane and 13.7 wt % water (total 96.1 wt %). The residue is a light amber, viscous liquid representing 80.0 wt % (420.0 g) of the sample charged, contains 23.7 wt % P-725, 23.7 wt % $CO_2$ and has the properties shown on Table 4. The $\overline{M}_n$ by end group (OH) titration is 1977.

TABLE 4

| Advanced | Wt % Residue | Wt % $CO_2$ | Viscosity (cps)[1] | | | Molecular Wt. | | | |
|---|---|---|---|---|---|---|---|---|---|
| | | | 25° | 50° C. | 90° C. | Peak | $\overline{M}_n$ | $\overline{M}_w$ | PDI |
| No | — | 21.7 | 980 | 185 | 37 | 950 | 603 | 1080 | 1.79 |
| Yes | 80.8 | 23.7 | 37,300 | 5400 | 600 | 4356 | 1921 | 4555 | 2.37 |

[1]Same as 1 in Table 1.

This example shows that P-725 can be incorporated into the backbone of a poly(alkylene carbonate) polyol at the 23.7 wt % level.

EXAMPLE 7

The low molecular weight poly(ethylene carbonate) polyol (317.2 g) used in Example 5, P-725 (210.0 g) and boiling stones (0.2 g) are combined in the same equipment as used in Example 3. The contents of the flask are heated to a pot temperature of 225° C. over a period of 2.5 hours at 10 mm Hg vacuum. The distillate collected in the water-chilled condenser accounts for 14.6 wt % (76.8 g) of the sample charged and has the following assay: density 1.13, 0.33 wt % monoethylene glycol, 1.27 wt % dioxane, 9.33 wt % ethylene carbonate, 78.4 wt % diethylene glycol, 8.75 wt % triethylene glycol, 0.43 wt % tetraethylene glycol, 0.04 wt % water (total (98.6 wt %). The distillate collected at −78° C. ac-

TABLE 3

| Advanced | Wt % Residue | Wt % $CO_2$ | Viscosity (cps)[1] | | | Molecular Wt. | | | |
|---|---|---|---|---|---|---|---|---|---|
| | | | 25° | 50° C. | 90° C. | Peak | $\overline{M}_n$ | $\overline{M}_w$ | PDI |
| No | — | 20.0 | 1100 | 190 | 35 | 1050 | 638 | 1169 | 1.83 |
| Yes | 80.7 | 22.0 | 23,300 | 3100 | 410 | 3200 | 1745 | 3626 | 2.19 |

[1]Same as 1 in Table 1.

counts for 2.9 wt % (15.5 g) of the sample charged and has the following assay: 68.5 wt % acetone, 23.0 wt % dioxane and 1.6 wt % water (total 93.1 wt %). The residue is a light amber, viscous liquid representing 81.7 wt % (430.6 g) of the sample charged, contains 48.8 wt % P-725, 13.5 wt % $CO_2$ and has the properties shown on Table 5. The $\overline{M}_n$ by end group (OH) titration is 2516.

TABLE 5

| Advanced | Wt % Residue | Wt % $CO_2$ | Viscosity (cps)[1] | | | Molecular Wt. | | | |
|---|---|---|---|---|---|---|---|---|---|
| | | | 25° | 50° C. | 90° C. | Peak | $\overline{M}_n$ | $\overline{M}_w$ | PDI |
| No | — | 20.0 | 1100 | 190 | 35 | 1050 | 638 | 1169 | 1.83 |
| Yes | 81.7 | 13.5 | 13,200 | 2150 | 325 | 5210 | 2391 | 5310 | 2.20 |

[1]Same as 1 in Table 1.

This example shows that P-725 can be incorporated into the backbone of a poly(alkylene carbonate) polyol at the 48.8% level.

EXAMPLE 8

The low molecular weight poly(ethylene carbonate) polyol (187.2 g) used in Example 5, P-725 (308.7 g) and boiling stones (0.2 g) are combined in the same equipment as used in Example 3. The contents of the flask are heated to 216° C. over a period of 2 hours at 10 mm Hg vacuum. The distillate collected in the water-chilled condenser accounts for 11.7 wt % (58.0 g) of the sample charged and has the following assay: density 1.12, 0.28 wt % monoethylene glycol, 0.60 wt % dixoane, 7.17 wt % ethylene carbonate, 75.2 wt % diethylene glycol, 8.87 wt % triethylene glycol, 0.40 wt % tetraethylene glycol, 0.04 wt % water (total 92.5 wt %). The distillate collected at −78° C. accounts for 1.7 wt % (8.2 g) of the sample charged and has the following assay: 76.7 wt % acetone, 13.9 wt % dioxane and 2.3 wt % water (total 92.9 wt %). The residue is a light straw, viscous liquid representing 86.3 wt % (428.1 g) of the sample charged, contains 72.1 wt % P-725, 7.7 wt % $CO_2$ and has the properties shown on Table 6. The $\overline{M}_n$ by end group (OH) titration is 1907.

TABLE 6

| Advanced | Wt % Residue | Wt % $CO_2$ | Viscosity (cps)[1] | | | Molecular Wt. | | | |
|---|---|---|---|---|---|---|---|---|---|
| | | | 25° | 50° C. | 90° C. | Peak | $\overline{M}_n$ | $\overline{M}_w$ | PDI |
| No | — | 20.0 | 1100 | 190 | 35 | 1050 | 638 | 1169 | 1.83 |
| Yes | 86.3 | 7.7 | 2600 | 600 | 110 | 3742 | 1904 | 3905 | 2.05 |

[1]Same as 1 in Table 1.

This example shows that P-725 can be incorporated into the backbone of a poly(alkylene carbonate) polyol at the 72.1 wt % level.

EXAMPLE 9

The low molecular weight poly(ethylene carbonate) polyol (184.8 g) used in Example 5, P-1200 (310.1 g, a poly(propylene glycol) with a $\overline{M}_n$ of 1200) and boiling stones (0.2 g) are combined in the same equipment as used in Example 3. The contents of the flask are heated to 202° C. over a period of 2 hours at 10 mm Hg vacuum. The distillate collected in the water-chilled condenser accounts for 11.5 wt % (56.8 g) of the sample charged and has the following assay: density 1.11, 0.34 wt % monoethylene glycol, 0.74 wt % dioxane, 8.42 wt % ethylene carbonate, 60.2 wt % diethylene glycol, 6.98 wt % triethylene glycol, 0.54 wt % tetraethylene glycol and 0.04 wt % water. The distillate collected at −78° C. accounts of 1.6 wt % (8.0 g) of the sample charged and has the following assay: 75.2 wt % acetone, 13.0 wt % dioxane and 1.8 wt % water (total 90.0 wt %). The residue is a straw colored, viscous liquid representing 86.6 wt % (428.7 g) of the sample charged, contains 72.3 wt % P-1200, 9.5 wt % $CO_2$ and has the following properties:

| Advanced | Wt % Residue | Wt % $CO_2$ | Molecular Weight | | | |
|---|---|---|---|---|---|---|
| | | | Peak | $\overline{M}_n$ | $\overline{M}_w$ | PDI |
| No | — | 20.0 | 1050 | 638 | 1169 | 1.83 |
| Yes | 86.6 | 9.5 | 3850 | 1712 | 4006 | 2.33 |

This example shows that P-1200 can be incorporated into the backbone of a poly(alkylene carbonate) polyol at the 72.3 wt % level.

EXAMPLE 10

The low molecular weight poly(ethylene carbonate) polyol (301. g) used in Example 5, tetraethylene glycol (190.2 g) and boiling stones (0.2 g) are combined in the same equipment as used in Example 3. The contents of the flask are heated to 235° C. over a period of 2.5 hours at 10 mm Hg vacuum. The distillate collected in the water-chilled condenser accounts for 35.0 wt % (171.8 g) of the sample charged and has the following assay: density 1.12, 0.37 wt % monoethylene glycol, 0.59 wt % dioxane, 3.70 wt % ethylene carbonate, 68.4 wt % diethylene glycol, 10.2 wt % triethylene glycol, 12.94 wt % tetraethylene glycol and 0.02 wt % water (total 96.2 wt %). The distillate collected at −78° C. accounts for 2.9 wt % (14.2 g) of the sample charged and has the following assay: 69.9 wt % acetone, 21.4 wt % dioxane and 2.6 wt % water (total 93.9 wt %). The residue is an amber, viscous liquid representing 61.2 wt % (300.9 g) of the sample charged, contains 55.8 wt % tetraethylene glycol, 20.4 wt % $CO_2$ and has the properties shown on Table 7. The $\overline{M}_n$ by end group (OH) titration is 2331.

TABLE 7

| Advanced | Wt % Residue | Wt % $CO_2$ | Viscosity (cps)[1] | | | Molecular Wt. | | | |
|---|---|---|---|---|---|---|---|---|---|
| | | | 25° | 50° C. | 90° C. | Peak | $\overline{M}_n$ | $\overline{M}_w$ | PDI |
| No | — | 20.0 | 1100 | 190 | 35 | 1050 | 638 | 1169 | 1.83 |

TABLE 7-continued

| Advanced | Wt % Residue | Wt % $CO_2$ | Viscosity (cps)[1] | | | Molecular Wt. | | | |
|---|---|---|---|---|---|---|---|---|---|
| | | | 25° | 50° C. | 90° C. | Peak | $\overline{M}_n$ | $\overline{M}_w$ | PDI |
| Yes | 61.2 | 20.4 | 26,500 | 4200 | 580 | 4650 | 2162 | 4759 | 2.20 |

[1]Same as 1 in Table 1.

This example shows that tetraethylene glycol can be incorporated into the backbone of a poly(alkylene carbonate) polyol at the 55.8 wt% level.

EXAMPLE 11

The low molecular weight poly(ethylene carbonate) polyol (304.2 g) used in Example 5, E-400 (190.1 g, a poly(ethylene glycol) with a $\overline{M}_n$ of 400) and boiling stones (0.2 g) are combined in the same equipment as used in Example 3. The contents of the flask are heated to 230° C. over a period of 2 hours at 10 mm Hg vacuum. The distillate collected in the water-chilled condenser accounts for 20.2 wt % (99.9 g) of the sample charged and has the following assay: density 1.12, 0.41 wt % monoethylene glycol, 0.99 wt % dioxane, 6.75 wt % ethylene carbonate, 81.1 wt % diethylene glycol, 9.06 wt % triethylene glycol, 0.55 wt % tetraethylene glycol and 0.03 wt % water (total 98.8 wt %). The distillate collected at −78° C. accounts of 3.1 wt % (15.4 g) of the sample charged and has the following assay: 64.0 wt % acetone, 27.5 wt % dioxane and 1.5 wt % water (total 93.0 wt %). The residue is an amber, viscous liquid representing 75.8 wt % (374.5 g) of the sample charged, contains 50.8 wt % E-400, 16.5 wt % $CO_2$ and has the properties shown on Table 8. The $\overline{M}_n$ by end group (OH) titration is 2337.

flask are heated at 10 mm Hg while increasing the reactor temperature. Samples are removed from the reactor at various times to measure the molecular weight advancement. Samples are also removed from the water-chilled distillate to determine distillate composition. The results are given in Table 9.

TABLE 9

| Sample Number | Reactor Temp. (°C.) | Wt % Distillate | Distillate Assay[2] | | | | | | Molecular Weight | | | |
|---|---|---|---|---|---|---|---|---|---|---|---|---|
| | | | MEG | Dioxane | EC | DEG | TriEG | TetraEG | Peak | $\overline{M}_n$ | $\overline{M}_w$ | PDI |
| 1 | 25 | 0 | — | — | — | — | — | — | 1060 | 638 | 1169 | 1.83 |
| 2 | 165 | 1.7 | 1.46 | — | 24.2 | 62.9 | 0.92 | — | 969 | 808 | 1506 | 1.86 |
| 3 | 176 | 4.3 | — | — | 5.20 | 82.1 | 3.04 | — | 1050 | 940 | 1895 | 2.21 |
| 4 | 188 | 7.2 | — | — | 0.67 | 89.3 | 4.25 | — | 2224 | 1183 | 2490 | 2.10 |
| 5 | 205 | 10.1 | — | 0.57 | — | 87.3 | 4.48 | Tr | 3212 | 1545 | 3606 | 2.33 |
| 6 | 220 | 11.7 | — | 1.03 | — | 85.2 | 3.95 | Tr | 3781 | 2012 | 4720 | 2.35 |
| 7 | 235 | 12.8 | — | 1.92 | — | 80.9 | 4.64 | 0.63 | 4101 | 2362 | 5692 | 2.41 |
| 8 | 250 | 14.1 | — | 3.36 | — | 74.4 | 5.44 | 1.04 | 5903 | 2742 | 7186 | 2.62 |
| 9 | 260 | 15.3 | — | 3.72 | — | 65.2 | 6.32 | 1.77 | 5903 | 2935 | 7541 | 2.57 |

[1]Amount of material in water chilled condenser, normalized to total reactants charged to the reactor.
[2]Compounds analyzed by capillary gas chromatography on a Hewlett-Packard 5840 A unit equipped with a J & W Scientific Company DB-1 fused silica capillary column, flame ionization detection. MEG—monoethylene glycol, dioxane, 1,4-dioxane, EC—ethylene carbonate, DEG—diethylene glycol, TriEG—triethylene glycol, TetraEG—tetraethylene glycol.

This example illustrates the systematic increase in molecular weight as the pot temperature is increased and distillate is removed. It also illustrates that diethylene glycol is the major component of the distillate. Triethylene glycol and tetraethylene glycol become important components in the distillate at higher temperatures.

Since in the process of this invention, a modifier is added to a poly(alkylene carbonate) polyahl and the resultant mixture is subjected to heating at reduce pressure with the removal of diethylene glycol (and/or other volatile components), and since the modifier is not chemically bound to the poly(alkylene carbonate) polyahl at the beginning of the reaction, and further since the modifier is in many cases not even compatible (present as a separate phase) with the poly(alkylene carbonate) polyahl at the beginning of the reaction, the relative volatilites of the modifier and the molecules being removed to drive the advancement reactions are very important. The boiling points of some selected compounds are given below to help illustrate this point.

TABLE 8

| Advanced | Wt % Residue | Wt % $CO_2$ | Viscosity (cps)[1] | | | Molecular Wt. | | | |
|---|---|---|---|---|---|---|---|---|---|
| | | | 25° | 50° C. | 90° C. | Peak | $\overline{M}_n$ | $\overline{M}_w$ | PDI |
| No | — | 20.0 | 1100 | 900 | 35 | 1050 | 638 | 1169 | 1.83 |
| Yes | 75.8 | 16.5 | 17,500 | 3000 | 470 | 4542 | 2063 | 4682 | 2.26 |

[1]Same as 1 in Table 1.

This example shows that E-400 can be incorporated into the backbone of a poly(alkylene carbonate) polyol at the 50.8 wt % level.

EXAMPLE 12

The low molecular weight poly(ethylene carbonate) polyol (34.8 g) used in Example 5, P-725 (52.2 g) and boiling stones (0.2 g) are combined in a 100 ml flask equipped with a thermometer, temperature controlled and a sample take-off head with a water-chilled condenser attached to a vacuum source through a dry ice-isopropanol (about −78° C.) trap. The contents of the

| Compound | Boiling Point at 10 mm Hg |
|---|---|
| Dipropylene Glycol | 116.2° C. |
| 1,4-Butanediol | 120° C. |
| Thiodiethanol | 128° C. |
| 1,6-Hexanediol | 132° C. |
| Diethylene Glycol | 133.8° C. |
| Tripropylene Glycol | 140.5° C. |
| Triethylene Glycol | 158.1° C. | sample charged. The composition as a function of pot temperature is illustrated on Table 10.

TABLE 10

| Sample Number | Pot Temp (°C.) | Distillate[1] (gms) | Distillate Assay[2] | | | | | Wt % of Total TriEG Present in Distillate |
| --- | --- | --- | --- | --- | --- | --- | --- | --- |
| | | | MEG | Dioxane | EC | DEG | TriEG | |
| 1 | 153 | 0 | 0 | 0 | 0 | 0 | 0 | 0 |
| 2 | 156 | 4.2 | 2.71 | 0 | 14.9 | 76.0 | 6.36 | 0.7 |
| 3 | 166 | 10.8 | 0.82 | 0 | 3.11 | 86.3 | 9.79 | 2.4 |
| 4 | 176 | 15.9 | 0.61 | 0 | 0 | 88.2 | 11.1 | 3.8 |
| 5 | 191 | 20.4 | 0 | 1.00 | 0 | 88.9 | 10.1 | 5.0 |
| 6 | 220 | 25.5 | 0 | 1.46 | 0 | 75.9 | 18.4 | 7.4 |
| 7 | 242 | 28.2 | 0 | 4.71 | 0 | 62.6 | 15.8 | 8.6 |

[1]Weight in grams of material in the water chilled condenser.
[2]Same as 2 in Table 9.

| Compound | Boiling Point at 10 mm Hg |
| --- | --- |
| Tetraethylene Glycol | 197.1° C. |

As illustrated in Example 10, tetraethylene glycol can function very well as a modifier due to the large difference in boiling points (approximately 63° C.) between it and diethylene glycol. Triethylene glycol and tripropylene glycol would also be expected to function as effective modifiers. Additional rectification can be added to the reaction system to contain such modifiers while they are reacting into the polymer backbone and at the same time permit the removal of diethylene glycol. Effectively modified poly(alkylene carbonate) polyahls are also produced when only a portion of the modifier is chemically bound into the polymer backbone and a portion of the modifier is removed as distillate. The modifier removed as distillate can be recycled to make the next batch of modified poly(alkylene carbonate) polyahl. The following examples will illustrate this concept.

EXAMPLE 13

A low molecular weight ($\overline{M}_n$ of 643) poly(ethylene carbonate) polyol (66.0 g), triethylene glycol (22.0 g) and boiling stones (0.2 g) are combined using the same reactor set up as used in Example 12 (no column to aid in rectification is used). The contents of the reactor are heated at 10 mm Hg vacuum while increasing the reactor temperature. The distillate is removed and analyzed at various times during the reaction to check for the presence of the modifier, triethylene glycol. The distillate collected at −78° C. accounts for 3.0 wt % (2.6 g) of the sample charged and has the following assay: 94.3 wt % dioxane. The distillate collected in the water-chilled condenser represents 32.3 wt % (28.4 g) of the sample charged. The composition as a function of pot temperature is illustrated on Table 10.

The residue is a light amber, viscous liquid representing 64.1 wt % (56.4 g) of the sample charged, contains 62 wt % triethylene glycol and has the following properties:

| Advance | Wt % Residue | Molecular Weight | | | PDI |
| --- | --- | --- | --- | --- | --- |
| | | Peak | $\overline{M}_n$ | $\overline{M}_w$ | |
| No | — | 1029 | 643 | 1179 | 1.84 |
| Yes | 64.1 | 5525 | 2234 | 5360 | 2.40 |

This example shows that triethylene glycol can be incorporated into the backbone of a poly(alkylene carbonate) polyol at a high level by the process of this invention.

EXAMPLE 14

The low molecular weight poly(ethylene carbonate) polyol (66.2 g) used in Example 13, 1,6-hexanediol (22.0 g) and boiling stones (0.2 g) are combined using the same reactor set up as used in Example 12. The contents of the reactor are heated using a staged reduction in pressure while increasing the reactor temperature. The distillate is removed and analyzed at various times during the reaction to check for the presence of the modifier, 1,6-hexanediol. The distillate collected at −78° C. accounts for 2.4 wt % (2.1 g) of the sample charged and has the following assay: 94.9 wt % dioxane. The distillate collected in the water-chilled condenser accounts for 36.3 wt % (32.0 g) of the sample charged. The composition as a function of pressure and temperature is shown on Table 11.

TABLE 11

| Sample Number | Pot Temp (°C.) | Vacuum (mm Hg) | Distillate[1] (gms) | Distillate Assay[2] | | | | | | Wt % of Total 1,6-Hexanediol Charged Present In Distillate |
| --- | --- | --- | --- | --- | --- | --- | --- | --- | --- | --- |
| | | | | MEG | Dioxane | EC | DEG | TriEG | 1,6-Hexanediol | |
| 1 | 184 | 50 | 0 | 0 | 0 | 0 | 0 | 0 | 0 | 0 |
| 2 | 185 | 50 | 0.8 | 3.85 | 2.65 | 7.85 | 58.0 | 2.55 | 22.7 | 0.8 |
| 3 | 189 | 50 | 4.3 | 2.38 | 0.64 | 5.86 | 75.5 | 2.93 | 12.7 | 2.9 |
| 4 | 198 | 50 | 12.1 | 0.75 | 0.82 | 1.83 | 78.3 | 3.94 | 14.3 | 7.9 |
| 5 | 198 | 10 | 27.4 | 0 | 0.58 | 0 | 73.3 | 9.55 | 16.6 | 19.5 |
| 6 | 220 | 10 | 30.8 | 0 | 0.62 | 0 | 73.3 | 9.12 | 15.8 | 21.9 |
| 7 | 240 | 10 | 32.0 | 0 | 1.59 | 0 | 70.0 | 7.61 | 15.2 | 22.8 |

[1]Same as 1 in Table 10.
[2]Same as 2 in Table 9.

The residue is a light yellow, viscous liquid representing 61.1 wt % (53.7 g) of the sample charged, contains 31.6 wt % 1,6-hexanediol and has the following properties:

| Advanced | Wt % Residue | Molecular Weight | | | |
|---|---|---|---|---|---|
| | | Peak | $\overline{M}_n$ | $\overline{M}_w$ | PDI |
| No | — | 1029 | 643 | 1179 | 1.84 |
| Yes | 61.1 | 5081 | 2684 | 6259 | 2.33 |

This example shows that 1,6-hexanediol can be incorporated into the backbone of a poly(alkylene carbonate) polyol at a high level by using a staged reduction of pressure.

EXAMPLE 15

A low molecular weight ($\overline{M}_n$ of 664) poly(ethylene carbonate) polyol (67.3 g), tripropylene glycol (22.4 g) and boiling stones (0.2 g) are combined using the same reactor set up as used in Example 12 except that a short glass column (10 mm × 120 mm) packed with stainless steel helices is attached to the reactor to provide some fractionation of the distillate. The contents of the reactor are heated at 30 mm Hg vacuum to a pot temperature of 220°. The distillate is removed and analyzed at various times during the reaction to check for the presence of the modifier, tripropylene glycol. The distillate collected at −78° C. accounts for 5.1 wt % (4.6 g) of the sample charged and has the following assay: 56.8 wt % acetone and 42.1 wt % dioxane. The distillate collected in the water-chilled condenser accounts for 18.8 wt % (16.9 g) of the sample charged. The composition as a function of temperature is shown on Table 12.

TABLE 12

| Sample Number | Pot Temp (°C.) | Distillate[1] (gms) | Distillate Assay[2] | | | | | | Wt % of Total TPG Present In Distillate |
|---|---|---|---|---|---|---|---|---|---|
| | | | MEG | Dioxane | EC | Tri-DEG | EG | TPG | |
| 1 | 182 | 0 | 0 | 0 | 0 | 0 | 0 | 0 | 0 |
| 2 | 186 | 2.3 | 9.83 | 1.93 | 25.2 | 44.5 | 0 | 7.05 | 0.7 |
| 3 | 926 | 6.6 | 0.38 | 0.63 | 0 | 72.0 | 0 | 24.1 | 5.4 |
| 4 | 202 | 11.3 | 0.53 | 1.24 | 0 | 72.3 | 0 | 24.9 | 10.6 |
| 5 | 220 | 16.9 | 0.28 | 1.56 | 0 | 71.5 | 0 | 20.8 | 15.8 |

[1]Weight in grams of material in the water chilled condenser.
[2]Compounds analyzed by capillary gas chromatography on a Hewlett-Packard 5840A unit equipped with a J & W Scientific Company DB-1 fused silica capillary column, flame ionization detection. MEG-monoethylene glycol, Dioxane - 1,4-dioxane, EC - ethylene carbonate, DEG-diethylene glycol, TriEG - triethylene glycol, TPG-tripropylene glycol.

The residue is a light yellow, viscous liquid representing 72.6 wt % (65.1 g) of the sample charged, contains 29.0 wt % of tripropylene glycol and has the following properties:

| Advanced | Wt % Residue | Molecular Weight | | | |
|---|---|---|---|---|---|
| | | Peak | $\overline{M}_n$ | $\overline{M}_w$ | PDI |
| No | — | 1115 | 664 | 1230 | 1.85 |
| Yes | 72.6 | 1250 | 779 | 1482 | 1.90 |

This example shows that tripropylene glycol can be incorporated into the backbone of a poly(alkylene carbonate) polyol by using a small column on the reactor even though the boiling points of diethylene glycol and tripropylene glycol are very close.

EXAMPLE 16

A low molecular weight ($\overline{M}_n$ of 633) poly(ethylene carbonate) polyol (77.5 g), Jeffamine D-400 (8.53 g, an aminated poly(propylene glycol) of $M_n$ of 430, a product of the Jefferson Chemical Division of Texaco) and boiling stones (0.2 g) are combined using the same reactor set up as used in Example 12. The contents of the reactor are heated at 10 mm Hg vacuum while increasing the reactor temperature. Samples of the distillate and the reactor are removed at various times during the reaction to check the distillate composition and the molecular weight advancement of the product. The results are given in Table 13. The distillate collected at −78° C. accounts for 3.3 wt % (2.8 g) of the sample charged and has the following assay: 95.3 wt % dioxane and 0.51 wt % monoethylene glycol. The distillate collected in the water-chilled condenser accounts for 17.4 wt % (15.0 g) of the sample charged and has the assay given in Table 13. The residue is a light amber, viscous liquid representing 68.7 wt % (59.1 g) of the sample charged, having an amino end group concentration of 0.548 milliequivalents per gram and containing about 10 wt % of Jeffamine D-400.

TABLE 13

| Sample Number | Pot Temp. (°C.) | Head Temp.[1] (°C.) | Size Exclusion Chromatography of Pot Samples[2] | | | | Distillate Analysis[3] | | | | | |
|---|---|---|---|---|---|---|---|---|---|---|---|---|
| | | | Peak | $\overline{M}_n$ | $\overline{M}_w$ | PDI | Total Wt (gms) | MEG (%) | Dioxane (%) | EC (%) | DEG (%) | TriEG (%) |
| 1 | 104 | 25 | 1074 | 633 | 1217 | 1.92 | 0 | ND | ND | ND | ND | ND |
| 2 | 150 | 34 | 1074 | 677 | 1127 | 1.66 | 0 | ND | ND | ND | ND | ND |
| 3 | 166 | 122 | 949 | 650 | 1061 | 1.63 | 1.6 | 2.7 | 0 | 34.4 | 60.6 | 0.9 |
| 4 | 172 | 126 | 1030 | 704 | 1338 | 1.89 | ND | ND | ND | ND | ND | ND |
| 5 | 175 | 126 | 1074 | 721 | 1351 | 1.87 | 4.1 | 1.1 | 0 | 11.8 | 85.7 | 1.4 |
| 6 | 183 | 130 | 1230 | 815 | 1363 | 1.67 | ND | ND | ND | ND | ND | ND |
| 7 | 187 | 131 | 1438 | 842 | 1531 | 1.81 | 7.5 | 0.4 | 0 | 2.0 | 94.1 | 3.1 |
| 8 | 195 | 132 | 1700 | 971 | 1797 | 1.85 | ND | ND | ND | ND | ND | ND |
| 9 | 205 | 131 | 2075 | 1092 | 2181 | 1.99 | Water'0.5 | 0.6 | 0.5 | 94.3 | 3.2 | |
| 10 | 217 | 130 | 2480 | 1234 | 2549 | 2.06 | ND | ND | ND | ND | ND | ND |
| 11 | 224 | 132 | 3058 | 1401 | 3096 | 2.20 | 12.8 | 0.4 | 2.6 | 0 | 90.1 | 3.6 |
| 12 | 232 | 130 | 3888 | 1607 | 3943 | 2.45 | ND | ND | ND | ND | ND | ND |

TABLE 13-continued

| Sample Number | Pot Temp. (°C.) | Head Temp.[1] (°C.) | Size Exclusion Chromatography of Pot Samples[2] | | | | Distillate Analysis[3] | | | | | |
|---|---|---|---|---|---|---|---|---|---|---|---|---|
| | | | Peak | $\overline{M}_n$ | $\overline{M}_w$ | PDI | Total Wt (gms) | MEG (%) | Dioxane (%) | EC (%) | DEG (%) | TriEG (%) |
| 13 | 241 | 131 | 4269 | 1713 | 4348 | 2.53 | 15.0 | 0.5 | 8.0 | 0.7 | 79.5 | 3.3 |

[1]Head Temp - temperature of distilling vapor.
[2]SEC used Water's Ultrastyragel 10³Å and 10⁴Å columns in series; THF as the mobile phase (1.5 ml/min); a Water's refractive index detector; calibrated with standard poly(ethylene glycols).
[3]Same qs 2 in Table 9.
ND = Not Determined.

This example shows that a polyamine can be incorporated into the backbone of a poly(alkylene carbonate) polyol by the method of this invention. In this case, the product is a polyahl since it has both hydroxyl and amino end groups.

EXAMPLE 17

The low molecular weight poly(ethylene carbonate) polyol (540.3 g) used in Example 5, P-725 (360.1 g) and boiling stones (0.2 g) are combined in the same equipment as used in Example 3, except the 500 ml boiling flask is replaced with a 1000-ml, 3-necked boiling flask. The contents of the flask are heated to a pot temperature of 252° C. over a period of 2.8 hours at 10 mm Hg vacuum. The distillate collected in the water-chilled condenser accounts for 20.1 wt % (180.9) of the sample charged and has the following assay: 1.41% dioxane, 1.30% ethylene carbonate, 83.0% diethylene glycol, 11.5% triethylene glycol and 0.35% tetraethylene glycol. The distillate collected at −78° C. accounts for 1.4 wt % (12.9 g) of the sample charged and has the following assay: 15.5 wt % acetone, 69.6 wt % dioxane and 14.8 wt % water (total 99.9 wt%). The residue is a yellow, viscous liquid containing 51.7% wt % P-725, 13.0 wt % $CO_2$, represents 77.4 wt % (696.7 g) of the sample charged and has the following properties shown on Table 14. The $\overline{M}_n$ by end group (OH) titration is 4582.

TABLE 14

| Advanced | Wt % Residue | Wt % $CO_2$ | Viscosity (cps)[1] | | | Molecular Wt. | | | |
|---|---|---|---|---|---|---|---|---|---|
| | | | 25° | 50° C. | 90° C. | Peak | $\overline{M}_n$ | $\overline{M}_w$ | PDI |
| No | — | 20.0 | 1,100 | 190 | 35 | 1050 | 638 | 1169 | 1.83 |
| Yes | 77.4 | 13.0 | 32,000 | 5,400 | 700 | 6458 | 3794 | 7809 | 2.06 |

[1]Same as 1 in Table 1.

This example shows that during the incorporation of a modifier such as P-725 into the backbone of a poly(alkylene carbonate)polyol the molecular weight can be advanced to higher values.

EXAMPLE 18

A low molecular weight ($\overline{M}_n$ of 455) poly(ethylene carbonate)polyol (65.4 g prepared from diethylene glycol, ethylene oxide and $CO_2$), succinic anhydride (15.0 g) and boiling stones (0.2 g) are combined using the same reactor set up as used in Example 12. The contents of the reactor are heated at 10 mm Hg vacuum while increasing the reactor temperature. Samples of the distillate and the reactor are removed at various times during the reaction to check the distillate composition and the molecular weight advancement of the product. The results are given in Table 15. The distillate collected at −78° C. accounts for 5.0 wt % (4.0 g) of the sample charged and has the following assay: 32.7 wt % acetone, 2.00 wt % dioxane and 61.8 wt % water. The residue is a straw-colored viscous liquid having an acid content of 0.60 meq/g, a Brookfield viscosity of 54,200 cps at 25° C. and represents 82.7 wt % (66.5 g) of the sample charged. Molecular weight studies show that there is no unreacted succinic anhydride in the product. Carbon-13 NMR shows that the product contains both carbonate ester (155.9 ppm) and succinate ester (173.0 ppm).

TABLE 15

| Sample Number | Pot Temp. (°C.) | Wt % Distillate[1] | Molecular Weight Data | | | | Distillate Assay[2] | | | |
|---|---|---|---|---|---|---|---|---|---|---|
| | | | Peak | $\overline{M}_n$ | $\overline{M}_w$ | PDI | MEG | EC | DEG | TrieG |
| Starting Material | — | — | 565 | 455 | 673 | 1.48 | — | — | — | — |
| 1 | 90 | — | 565 | 455 | 657 | 1.48 | — | — | — | — |
| 2 | 165 | — | 635 | 513 | 751 | 1.46 | — | — | — | — |
| 3 | 169 | — | 714 | 568 | 863 | 1.52 | — | — | — | — |
| 4 | 200 | 2.2 | 1026 | 733 | 1222 | 1.67 | 0.37 | 47.9 | 48.3 | 1.57 |
| 5 | 230 | 3.2 | 1794 | 1058 | 2001 | 1.89 | 0.46 | 13.9 | 77.5 | 3.11 |
| 6 | 242 | 4.9 | 2303 | 1329 | 2671 | 2.01 | 0 | 5.70 | 78.6 | 8.37 |
| 7 | 251 | 5.4 | 3273 | 1583 | 3391 | 2.14 | 0 | 2.94 | 78.4 | 8.20 |
| 8 | 264 | 6.5 | 3701 | 1843 | 4086 | 2.22 | 0 | 2.66 | 73.2 | 13.2 |

[1]Same as 1 in Table 9.
[2]Same as 2 in Table 9.

This example shows that succinic anhydride is an effective modifier and can be incorporated into the backbone of a poly(alkylene carbonate)polyol during molecular weight advancement to form a poly(alkylene carbonate)polyahl having both OH and COOH end groups. Water is a reaction by-product.

EXAMPLE 19

A sample of the same low molecular weight ($\overline{M}_n$ of 455) poly(ethylene carbonate)polyol used in Example 18 (71.7 g), adipic acid (10.0 g) and boiling stones (0.2 g) are combined using the same reactor set up as used in Example 12. The contents of the reactor are heated at 10 mm Hg vacuum while increasing the reactor temperature. Samples of the distillate and the reactor are removed at various times during the reaction to check the distillate composition and the molecular weight build of the product. The results are given in Table 16. The distillate collected at −78° C. accounts for 5.0 wt % (4.1 g) of the sample charged and has the following assay: 37.2 wt % acetone, 3.84 wt % dioxane and 51.1 wt % water. The residue is a straw colored, viscous liquid having an acid content of 0.121 meq/g (95% acid conversion), a Brookfield viscosity of 9700 cps at 25° C. and represents 74.3 wt % (60.7 g) of the sample charged. Carbon-13 NMR shows that the product contains both carbonate ester (155.7 ppm) and adipate ester (173.4 ppm).

to 10 mm Hg. Samples of the distillate and the reactor are removed at various times during the reaction to check the distillate composition and the molecular weight advancement of the product. The results are given in Table 17. The distillate collected at −78° C. accounts for 8.5 wt % (7.4 g) of the sample charged and has the following assay: 31.8 wt % acetone, 44.5 wt % methanol, 3.65 wt % dioxane and 4.7 wt % water. The residue is a straw colored, viscous liquid having a Brookfield viscosity of 58,800 cps at 24° C. and represents 70.5 wt % (61.1 g) of the sample charged. Carbon-13 NMR shows that the product contains both carbonate ester (155.7 ppm) and adipate ester (173.4 ppm) and no dimethyl adipate.

TABLE 17

| Sample Number | Pot Temp. (°C.) | Vacuum (mm Hg) | Wt % Distillate[1] | Molecular Weight | | | | Distillate Assay[2] | | | | | |
|---|---|---|---|---|---|---|---|---|---|---|---|---|---|
| | | | | Peak | $\overline{M}_n$ | $\overline{M}_w$ | PDI | MEG | Dioxane | EC | DEG | TriEG | TetraEG | Dimethyl Adipate |
| 1 | 157 | 50 | 0 | 587 | 521 | 735 | 1.41 | — | — | — | — | — | — | — |
| 2 | 200 | 50 | 0 | 1048 | 762 | 1252 | 1.62 | — | — | — | — | — | — | — |
| 3 | 195 | 14 | 4.8 | 1616 | 990 | 1814 | 1.83 | 0.65 | 1.00 | 10.6 | 75.3 | 8.8 | — | 1.53 |
| 4 | 200 | 10 | 8.5 | 2209 | 1261 | 2442 | 1.94 | 0 | 0 | 1.34 | 82.3 | 12.8 | 0.30 | 0.53 |
| 5 | 217 | 10 | 10.6 | 2776 | 1546 | 3156 | 2.04 | 0 | 0 | 0.26 | 86.5 | 8.2 | 0 | 0.29 |
| 6 | 230 | 10 | 12.2 | 3553 | 1855 | 4004 | 2.16 | 0 | 0.46 | 0.57 | 78.9 | 10.3 | 0 | 0.90 |
| 7 | 240 | 10 | 13.2 | 4183 | 1874 | 4241 | 2.26 | 0 | 0.46 | 1.02 | 78.2 | 9.4 | 0.28 | 0.60 |
| 8 | 250 | 10 | 14.4 | 4623 | 2338 | 5331 | 2.28 | 0 | 0.75 | 0.88 | 70.5 | 12.6 | 0.39 | 0.34 |

[1]Same as 1 in Table 9.
[2]Same as 2 in Table 9.

This example shows that dimethyl adipate is an effective modifier and that its adipic acid portion can be effectively incorporated into the backbone of a poly(alkylene carbonate)polyol during molecular weight advancement. Methanol is a reaction by-product.

EXAMPLE 21

A sample of a low molecular weight ($\overline{M}_n$ of 455) poly(ethylene carbonate)polyol (70.5 g), dimethyl terephthalate (10.0 g) and boiling stones (0.2 g) are combined using the same reactor set up as used in Example 12. The contents of the reactor are heated at 10 mm Hg vacuum while increasing the reactor temperature. Samples of the distillate and the reactor are removed at various times during the reaction to check the distillate composition and the molecular weight advancement of the product. The results are given in Table 18. The distillate collected at −78° C. accounts for 7.2 wt % (5.8 g) of the sample charged and has the following assays: 35.4 wt % acetone, 30.3 wt % methanol, 15.5 wt % dioxane and 6.3 wt % water. The residue is a light amber, viscous liquid having a Brookfield viscosity of 875,000 cps at 25° C. and represents 62.0 wt % (49.9 g) of the sample charged. Carbon-13 NMR shows that the product contains both carbonate ester (155.3 ppm) and

TABLE 16

| Sample Number | Pot Temp. (°C.) | Wt % Distillate[1] | Molecular Weight | | | | Distillate Assay[2] | | | | |
|---|---|---|---|---|---|---|---|---|---|---|---|
| | | | Peak | $\overline{M}_n$ | $\overline{M}_w$ | PDI | MEG | EC | DEG | TriEG | TetraEG |
| 1 | 100 | — | 225 | 390 | 618 | 1.58 | — | — | — | — | — |
| 2 | 170 | 5.6 | 544 | 428 | 638 | 1.49 | 0.95 | 19.2 | 76.2 | 3.2 | 0 |
| 3 | 197 | 8.3 | 673 | 506 | 773 | 1.53 | 0 | 4.0 | 83.5 | 12.2 | 0 |
| 4 | 221 | 10.7 | 873 | 621 | 1013 | 1.63 | 0 | 0.9 | 48.6 | 47.3 | 1.21 |
| 5 | 228 | 12.1 | 1137 | 784 | 1349 | 1.72 | 0 | 0.7 | 44.9 | 48.3 | 2.55 |
| 6 | 250 | 13.3 | 1398 | 888 | 1600 | 1.80 | 0 | 0.9 | 48.7 | 42.8 | 3.09 |
| 7 | 262 | 16.0 | 2119 | 1183 | 2315 | 1.96 | 0 | 0.9 | 53.8 | 34.2 | 4.79 |

[1]Same as 1 in Table 9.
[2]Same as 2 in Table 9.

This example shows that adipic acid is an effective modifier and can be incorporated into the backbone of a poly(alkylene carbonate)polyol during molecular weight advancement to form a poly(alkylene carbonate)polyahl having both OH and COOH end groups. Water is a reaction by-product.

EXAMPLE 20

A sample of a low molecular weight ($\overline{M}_n$ of 455) poly(ethylene carbonate)polyol (72.7 g), dimethyl adipate (14.0 g) and boiling stones (0.2 g) are combined using the same reactor set up as used in Example 12. The contents of the reactor are heated at 50 mm Hg vacuum for 1.0 hour at total reflux, during which time the pot temperature increases from 144° C. to 200° C. This is necessary since dimethyl adipate (boiling point = 109°–110° C. at 14 mm Hg) is more volatile then diethylene glycol. The vacuum is then slowly adjusted terephthalate ester (165.5 ppm) and no dimethyl terephthalate.

acetone, 18.7% dioxane and 21.8% water. The residue is a tan solid containing 60.5 wt % modifier, represents

TABLE 18

| Sample Number | Pot Temp. (°C.) | Wt % Distillate[1] | Molecular Weight Data | | | | Distillate Assay[2] | | | | |
|---|---|---|---|---|---|---|---|---|---|---|---|
| | | | Peak | $\overline{M}_n$ | $\overline{M}_w$ | PDI | Dioxane | EC | DEG | TriEG | Dimethyl Terephthalate |
| 1 | 140 | 0 | 565 | 441 | 647 | 1.47 | — | — | — | — | — |
| 2 | 163 | 0 | 1048 | 720 | 1212 | 1.68 | — | — | — | — | — |
| 3 | 177 | 8.0 | 1369 | 874 | 1563 | 1.79 | 0 | 8.45 | 73.6 | 6.30 | 9.60 |
| 4 | 195 | 12.8 | 1991 | 1180 | 2288 | 1.94 | 0 | 3.62 | 77.6 | 9.11 | 7.51 |
| 5 | 220 | 16.5 | 3481 | 1738 | 3711 | 2.14 | 0.56 | 1.01 | 84.8 | 8.12 | 2.75 |
| 6 | 235 | 18.4 | 5107 | 2308 | 5185 | 2.25 | 1.76 | 0.71 | 79.9 | 10.5 | 0.95 |
| 7 | 248 | 20.4 | 7242 | 3130 | 7451 | 2.38 | 4.47 | 1.05 | 67.9 | 9.90 | 1.14 |
| 8 | 260 | 22.0 | 8886 | 3778 | 9259 | 2.45 | 7.53 | 1.45 | 47.9 | 11.4 | 1.57 |

[1]Same as 1 in Table 9.
[2]Same as 2 in Table 9.

This example shows that dimethyl terephthalate is an effective modifier and that its terephthalic acid portion can be effectively incorporated into the backbone of a poly(alkylene carbonate)polyol during molecular weight advancement. Methanol is a reaction by-product.

EXAMPLE 22

A low molecular weight ($\overline{M}_n$ of 664) poly(ethylene carbonate)polyol (541.4 g), 4,8-bis(hydroxymethyl)-tricyclo[5.2.1.0$^{2,6}$]decane (361.5 g) and boiling stones (0.2 g) are combined using the same reactor set up as in Example 17. The contents of the flask are heated to a pot temperature of 240° C. over a period of 2.5 hours at 10 mm Hg vacuum. The distillate collected in the water-chilled condenser accounts for 35.6 wt % (321.8 g) of the sample charged and has the following assay: 0.49% monoethylene glycol, 3.21% ethylene carbonate, 66.4% diethylene glycol, 23.1% triethylene glycol and 5.5% 4,8-bis(hydroxymethyl)tricyclo[5.2.1.0$^{2,6}$]decane. The distillate collected at −78° C. accounts for 0.8 wt % (7.3 g) of the sample charged and has the following assay: 56.7% acetone, 17.7% dioxane, and 9.9% water. The residue is a very viscous, yellow liquid containing 60.2 wt % modifier, represents 63.3 wt % (571.5 g) of the sample charged and has the following properties.

| Advanced | Wt % Residue | Molecular Weight | | | |
|---|---|---|---|---|---|
| | | Peak | $\overline{M}_n$ | $\overline{M}_w$ | PDI |
| No | — | 871 | 664 | 1085 | 1.63 |
| Yes | 63.3 | 3997 | 1950 | 4308 | 2.21 |

This example shows that a tricyclic diol is an effective modifier and can be incorporated into the backbone of a poly(alkylene carbonate)polyol during molecular weight advancement.

EXAMPLE 23

A low molecular weight ($\overline{M}_n$ of 664) poly(ethylene carbonate)polyol (546.7 g), hydroquinonebis(2-hydroxyethyl)ether (360.0 g) and boiling stones (0.2 g) are combined using the same reactor set up as in Example 17. The contents of the flask are heated to a pot temperature of 240° C. over a period of 2.5 hours at 10 mm Hg vacuum. The distillate collected in the water-chilled condenser accounts for 33.2 wt % (301.0 g) of the sample charged and has the following assay: 4.10% ethylene carbonate, 70.8% diethylene glycol, 21.4% triethylene glycol and 1.2% tetraethylene glycol. The distillate collected at −78° C. accounts for 0.8 wt % (7.3 g) of the sample charged and has the following assay: 54.7% acetone, 18.7% dioxane and 21.8% water. The residue is a tan solid containing 60.5 wt % modifier, represents 65.6 wt % (595.1 g) of the sample charged and has the following properties:

| Advanced | Wt % Residue | Molecular Weight | | | |
|---|---|---|---|---|---|
| | | Peak | $\overline{M}_n$ | $\overline{M}_w$ | PDI |
| No | — | 871 | 664 | 1085 | 1.63 |
| Yes | 65.6 | 2746 | 1462 | 3039 | 2.08 |

This example shows that a polyol containing aromatic moieties is an effective modifier and can be incorporated into the backbone of a poly(alkylene carbonate)polyol during molecular weight advancement.

EXAMPLE 24

A low molecular weight ($\overline{M}_n$ of 664) poly(ethylene carbonate)polyol (539.9 g), poly(caprolactone)diol (360.3 g) ($\overline{M}_n$ of 530) and boiling stones (0.2 g) are combined using the same reactor set up as in Example 17. The contents of the flask are heated to a pot temperature of 235° C. over a period of 2.5 hours at 10 mm Hg vacuum. The distillate collected in the water-chilled condenser accounts for 75.4 wt % (679.1 g) of the sample charged and has the following assay: 5.7% ethylene carbonate, 66.7 diethylene glycol and 10.9% triethylene glycol. The distillate collected at −78° C. accounts for 0.8 wt % (7.0 g) of the sample charged and has the following assay: 54.5% acetone, 22.6% dioxane and 15.5% water. The residue is a light yellow, viscous liquid containing 53.1 wt % modifier, represents 75.4 wt % (679.1 g) of the sample charged and has the following properties:

| Advanced | Wt % Residue | Molecular Weight | | | |
|---|---|---|---|---|---|
| | | Peak | $\overline{M}_n$ | $\overline{M}_w$ | PDI |
| No | — | 871 | 664 | 1085 | 1.63 |
| Yes | 75.4 | 3695 | 2218 | 5091 | 2.30 |

The $M_n$ by end group (OH) titration is 2658.

This example shows that a polyester polyol is an effective modifier and can be incorporated into the backbone of a poly(alkylene carbonate)polyol during molecular weight advancement.

EXAMPLE 25

A low molecular weight ($\overline{M}_n$ of 664) poly(ethylene carbonate)polyol (540.5 g), B-500 (360.3 g. a poly(1,2-butylene glycol) with a $\overline{M}_n$ of the 482) and boiling stones (0.2 g) are combined using the same reactor set up as in Example 17. The contents of the flask are heated to a pot temperature of 235° C. over a period of 2.5 hours at 10 mm Hg vacuum. The distillate collected in the water-chilled condenser accounts for 22.3 wt % (200.9 g) of the sample charged and has the following assay: 1.52% dioxane, 6.68% ethylene carbonate, 74.7 diethylene glycol, 14.9% triethylene glycol and 0.51 tetraethylene glycol. The distillate collected at −78° C. accounts for 1.5 wt % (13.3 g) of the sample charged and has the following assay: 30.9% acetone, 50.9% dioxane and 6.3% water. The residue is a light yellow, viscous liquid containing 53.0 wt % B-500, having a Brookfield viscosity of 14,820 cps at 23° C., represents 75.4 wt % (679.0 g) of the sample charged and has the following properties:

| Advanced | Wt % Residue | Molecular Weight | | | |
|---|---|---|---|---|---|
| | | Peak | $\overline{M}_n$ | $\overline{M}_w$ | PDI |
| No | — | 871 | 664 | 1085 | 1.63 |
| Yes | 75.4 | 3156 | 1933 | 4238 | 2.19 |
| B-500 | — | 498 | 482 | 537 | 1.12 |

The $\overline{M}_n$ by end group (OH) titration is 2386.

This example shows that a poly(butylene glycol) is an effective modifier and can be incorporated into the backbone of a poly(alkylene carbonate)polyol during molecular weight advancement.

EXAMPLE 26

A low molecular weight ($\overline{M}_n$ of 664) poly(ethylene carbonate)polyol (530.3 g), B-700 (380.2 g, a poly(1,2-butylene glycol) with a $\overline{M}_n$ of 700) and boiling stones (0.2 g) are combined using the same reactor set up as in Example 17. The contents of the flask are heated to a pot temperature of 225° C. over a period of 2 hours at 10 mm Hg vacuum. The distillate collected in the water-chilled condenser accounts for 19.3 wt % (175.3 g) of the sample charged and has the following assay: 0.72% dioxane, 6.15% ethylene carbonate, 73.0% diethylene glycol, 16.1% triethylene glycol and 0.71% tetraethylene glycol. The distillate collected at −78° C. accounts for 1.0 wt % (9.4 g) of the sample charged and has the following assay: 42.2% acetone, 40.9 dioxane and 10% water. The residue is a light straw, viscous liquid containing 52.6 wt % B-700, having a Brookfield viscosity of 23,450 cps at 23° C., represents 79.4 wt % (722.7 g) of the sample charged and has the following properties:

| Advanced | Wt % Residue | Molecular Weight | | | |
|---|---|---|---|---|---|
| | | Peak | $\overline{M}_n$ | $\overline{M}_w$ | PDI |
| No | — | 871 | 664 | 1085 | 1.63 |
| Yes | 79.4 | 4405 | 2230 | 5152 | 2.21 |

The $\overline{M}_n$ end group (OH) titration is 2530.

This example shows that a different poly(butylene glycol) is an effective modifier and can be incorporated into the backbone of a poly(alkylene carbonate)polyol during molecular weight advancement.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all the features which would be considered as equivalents thereof by those skilled in the art to which this invention pertains.

What is claimed is:

1. A process for preparing a modified poly(alkylene carbonate)polyahl, which comprises:
reacting a poly(alkylene carbonate)polyahl with a modifier selected from the group consisting of polyesters, polyfunctional cyclic anhydrides, and polyahls to form a modified poly(alkylene carbonate)polyahl having an increased molecular weight, and removing at least one gaseous compound other than a monoalkylene glycol from said reaction, said gaseous compound being at least as volatile as a tetraethylene glycol and said modifier (1) having a plurality of moieties that are reactive with a residue selected from the group consisting of carbonate and active hydrogen moieties of the poly(alkylene carbonate)polyahl and (2) being about as volatile or less volatile than the major gaseous compound removed; the ratio of said modifier per equivalent of active moiety of the poly(alkylene carbonate)polyahl and said reaction conditions being sufficient to provide a modification of the poly(alkylene carbonate)polyahl.

2. The process of claim 1, in which said reaction forming a modified poly(alkylene carbonate)polyahl takes place simultaneously with removing at least one gaseous compound other than a monoalkylene glycol.

3. The process of claim 1, wherein a dialkylene glycol is removed from said reaction.

4. The process of claim 1, wherein a trialkylene glycol is removed from said reaction.

5. The process of claim 1 wherein an initiator is removed from said reaction.

6. The process of claim 2, 3, 4 or 5 wherein the reacting step is conducted at subatmospheric pressure.

7. The process of claim 2 wherein the reacting step is conducted at a temperature between about 150° C. and about 300° C.

8. The process of claim 2 wherein the reacting step is conducted at a pressure of about 100 mm Hg or less.

9. The process of claim 2, wherein the poly(alkylene carbonate) polyahl is a random polymer which corresponds to the formula:

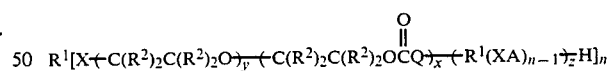

wherein

R¹ is separately in each occurrence an n-valent hydrocarbon radical or hydrocarbon radical which can contain one or more heteroatoms of O, N or S;

R² is separately in each occurrence hydrogen, halogen, a nitro group, a cyano group, a C$_{1-20}$ hydrocarbyl group or a C$_{1-20}$ hydrocarbyl group substituted with one or more of the following: a halo, cyano, nitro, thioalkyl, tert-amino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl, aralkylcarbonyl, alkylsulfinyl, arylsulfinyl, aralkylsulfinyl, alkylsulfonyl, arylsulfonyl, or aralkylsulfonyl group;

X is separately in each occurrence S, O, NH,

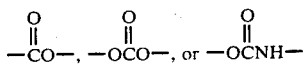

A is separately in each occurrence

combinations thereof or a covalent bond;

Q is separately in each occurrence O, SO or NH provided that all carbonate moieties are internal because terminal carbonate moieties are unstable and form OH moieties by the elimination of $CO_2$;

n is separately in each occurrence an integer of from 1 to 25;

x is separately in each occurrence an integer of from 1 to 40;

y is separately in each occurrence an integer of from 1 to 120; and z is separately in each occurrence an integer of from 0 to 5.

10. The process of claim 9 wherein
X is oxygen,
x is separately in each occurrence an integer from 2 to 10,
y is separately in each occurrence an integer from 5 to 15, and
z is an integer from 0 to 2, provided that the ratio of y to x is from 1:1 to 3:1.

11. The process of claim 10 wherein $R^1$ is aliphatic or cycloaliphatic hydrocarbon containing one or more oxygen, nitrogen, or sulfur moieties; $R^2$ is hydrogen, $C_{1-20}$ alkyl, $C_{1-20}$ haloalkyl, $C_{1-20}$ alkenyl or phenyl; X is S, O, or NH; and n is an integer from 1 to 10.

12. The process of claim 11, wherein $R^1$ is an valent alkane or cycloalkane, or an n valent alkane or cycloalkane containing one or more oxygen, nitrogen, or sulfur moieties; $R^2$ is hydrogen, methyl or ethyl; X is O; and n is an integer from 1 to 5.

13. The process of claim 12 wherein $R^1$ is an n valent $C_{1-10}$ alkane or an n valent $C_{1-10}$ alkane substituted with one or more oxygen moieties; $R^2$ is hydrogen or methyl; and n is 1 or 2.

14. The process of claim 13 wherein $R^2$ is hydrogen.

15. The process of claim 1 wherein said modified poly(alkylene carbonate)polyhahl includes about 80% by weight of said poly(alkylene carbonate)polyahl and about 20% by weight of said modifier.

16. The process of claim 1 wherein said modified poly(alkylene carbonate)polyahl include about 75% by weight of said poly(alkylene carbonate)polyahl and about 25% by weight of said modifier.

17. The process of claim 1 wherein said modified poly(alkylene carbonate)polyahl includes about 50% by weight of said poly(alkylene carbonate)polyahl and about 50% by weight of said modifier.

18. The process of claim 1 wherein said modified poly(alkylene carbonate)polyahl includes about 25% by weight of said poly(alkylene carbonate)polyahl and about 75% by weight of said modifier.

19. The process of claim 1 wherein said modifier is 1,2,3-trihydroxypropane.

20. The process of claim 1 wherein said modifier is poly(propylene glycol).

21. The process of claim 1 wherein said modifier is tetraethylene glycol.

22. The process of claim 1 wherein said modifier is poly(ethylene glycol).

23. The process of claim 1 wherein said modifier is triethylene glycol.

24. The process of claim 1 wherein said modifier is tripropylene glycol.

25. The process of claim 1 wherein said modifier is 1,6-hexanediol.

26. The process of claim 1 wherein said modifier is an aminated poly(propylene glycol).

27. The process of claim 1, wherein said modifier is a polyamine.

28. The process of claim 1, wherein said modifier is a polyahl containing two or more functional groups.

29. The process of claim 1, wherein said modifier is a polyester.

30. The process of claim 1, wherein said modifier is a cyclic anhydride.

31. The process of claim 1 wherein the ratio of modifier is from about 0.1 to about 3 equivalents of reactive moieties of modifier per equivalent of active moiety of the poly(alkylene carbonate) polyahl.

32. The process of claim 1, wherein said modifier is succinic anhydride.

33. The process of claim 1, wherein said modifier is a hydroxy-containing polyester.

34. The process of claim 1, wherein said modifier is adipic acid.

35. The process of claim 1, wherein said modifier is a polyhydric alcohol.

36. The process of claim 1, wherein said modifier is dimethyl adipate.

37. The process of claim 1, wherein said modifier is dimethyl terephthalate.

38. The process of claim 1, wherein said modifier is 4,8-bis-(hydroxymethyl)tricyclo[5.1.2.0$^{2,6}$]decane.

39. The process of claim 1, wherein said modifier is hydroquinonebis(2-hydroxyethyl)ether.

40. The process of claim 1, wherein said modifier is a poly(caprolactone)diol.

41. The process of claim 1, wherein said modifier is a poly(1,2-butylene gylcol).

42. The process of claim 1, wherein said poly(alkylene carbonate)polyahl to be modified is a poly(ethylene carbonate)polyol.

43. The process of claim 1, wherein said modifier is a polyacid.

44. The process of claim 1, wherein a mixture of two or more modifiers is used.

45. A process for modifying a poly(alkylene carbonate)polyahl which comprises:
reacting a poly(alkylene carbonate)polyahl with a modifier selected from the group consisting of polyesters, polyfunctional cyclic anhydrides and polyahls capable of reacting with a residue selected from the group consisting of carbonates and active hydrogen moieties of the poly(alkylene carbonate)polyahl and removing a compound selected from the group consisting of dialkylene glycol, trialkylene glycol and initiator molecules to form a modified poly(alkylene carbonate)polyahl of increased molecular weight; the ratio of said modifier per equivalent of active moiety of the poly(alkylene carbonate) polyahl and said reaction conditions being sufficient to provide a modification of the poly(alkylene carbonate)polyahl.

46. The process of claim 45 wherein the modifier is a poly(butylene glycol).

47. The process of claim 45 wherein the modifier is a polyester polyol.

48. The process of claim 47 wherein the polyester polyol is poly(caprolactone) diol, ethylene glycol adipate, diethylene glycol adipate or propylene glycol adipate.

49. The process of claim 45, in which said reaction forming a modified poly(alkylene carbonate)polyahl takes place simultaneously with removing at least one gaseous compound other than a monoalkylene glycol.

50. The process of claim 45, wherein a dialkylene glycol is removed from said reaction.

51. The process of claim 45, wherein a trialkylene glycol is removed from said reaction.

52. The process of claim 45 wherein a modifier is removed from said reaction.

53. The process of claim 45 wherein the reacting step is conducted at subatmospheric pressure.

54. The process of claim 45 wherein the reacting step is conducted at a temperature between about 150° C. and about 300° C.

55. The process of claim 45 wherein the reacting step is conducted at a pressure about 100 mm Hg or less.

56. The process of claim 45 wherein the poly(alkylene carbonate)polyahl is a random polymer which corresponds to the formula:

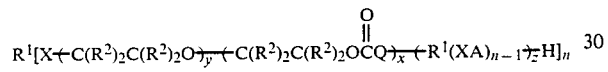

wherein
R$^1$ is separately in each occurrence an n-valent hydrocarbon radical or hydrocarbon radical which can contain one or more heteroatoms of O, N or S;
R$^2$ is separately in each occurrence hydrogen, halogen, a nitro group, a cyano group, a C$_{1-20}$ hydrocarbyl group of a C$_{1-20}$ hydrocarbyl group substituted with one or more of the following: a halo, cyano, nitro, thioalkyl, tertamino, alkoxy, aryloxy, aralkoxy, carbonyldioxyalkyl, carbonyldioxyaryl, carbonyldioxyaralkyl, alkoxycarbonyl, aryloxycarbonyl, aralkoxycarbonyl, alkylcarbonyl, arylcarbonyl aralkylcarbonyl, alksulfinyl, arylsulfinyl, aralkylsulfinyl, alkylsulfonyl, arylsulfonyl, or aralkylsulfonyl group;
X is separately in each occurrence S, O, NH, $$-\overset{O}{\overset{\|}{C}}O-, \ -O\overset{O}{\overset{\|}{C}}O-, \ \text{or} \ -O\overset{O}{\overset{\|}{C}}NH-$$

A is separately in each occurrence

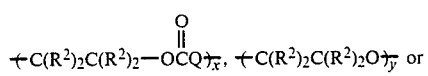

combinations thereof or a covalent bond;
Q is separately in each occurrence O, S or NH provided that all carbonate moieties are internal because terminal carbonate moieties are unstable and form OH moieties by the elimination of CO$_2$;
n is separately in each occurrence an integer of from 1 to 25;
x is separately in each occurrence an integer of from 1 to 40;
y is separately in each occurrence an integer of from 1 to 120; and
z is separately in each occurrence an integer of from 0 to 5.

57. The process of claim 56 wherein
X is oxygen,
x is separately in each occurrence an integer from 2 to 10,
y is separately in each occurrence an integer from 5 to 15, and
z is an integer from 0 to 2, provided that the ratio of y to x is from 1:1 to 3:1.

58. The process of claim 57 wherein R$^1$ is aliphatic or cycloaliphatic hydrocarbon containing one or more oxygen, nitrogen, or sulfur moieties; R$^2$ is hydrogen, C$_{1-20}$ alkyl, C$_{12-20}$ haloalkyl, C$_{1-20}$ alkenyl or phenyl; X is S, O, or NH; and n is an integer from 1 to 10.

59. The process of claim 57, wherein R$^1$ is an n valent alkane or cyclolalkane, or an n valent alkane or cycloalkane containing one or more oxygen, nitrogen, or sulfur moieties; R$^2$ is hydrogen, methyl or ethyl; X is O; and n is an integer from 1 to 5.

60. The process of claim 59 wherein R$^1$ is an n valent C$_{1-10}$ alkane or an n valent C$_{1-10}$ alkane substituted with one or more oxygen moieties; R$^2$ is hydrogen or methyl; and n is 1 or 2.

61. The process of claim 60 wherein R$^2$ is hydrogen.

62. The process of claim 45 wherein said modified poly(alkylene carbonate)polyahl includes about 80% by weight of said poly(alkylene carbonate)polyahl and about 20% by weight of said modifier.

63. The process of claim 45 wherein said modified poly(alkylene carbonate)polyahl includes about 75% by weight of said poly(alkylene carbonate)polyahl and about 25% by weight of said modifier.

64. The process of claim 45 wherein said modified poly(alkylene carbonate)polyahl includes about 50% by weight of said poly(alkylene carbonate)polyahl and about 50% by weight of said modifier.

65. The process of claim 45 wherein said modified poly(alkylene carbonate)polyahl includes about 25% by weight of said poly(alkylene carbonate)polyahl and about 75% by weight of said modifier.

66. The process of claim 45 wherein the ratio of modifier is from about 0.1 to about 3 equivalents of reactive moieties of modifier per equivalent of active moiety of the poly(alkylene carbonate)polyahl.

67. The process of claim 45 wherein said poly(alkylene carbonate)polyhal to be modified is a poly(ethylene carbonate)polyol.

68. The process of claim 1, wherein
the reaction is conducted at a temperature between about the temperature of splitting of the volatile compound and the lower temperature of decomposition of poly(alkylene carbonate)polyahl or modified poly(alkylene carbonate)polyahl.

69. The process of claim 1, wherein
the reaction is conducted at a temperature and a pressure at which dialkylene glycol and the at least one other gaseous compound can be volatilized.

70. The process of claim 49, wherein
the reaction is conducted at a temperature and a pressure at which dialkylene glycol and the at least one gaseous compound other than monoalkylene glycol can be volatilized.

71. The process of claim 70, wherein
the reaction temperature is between about the temperature of splitting of the at least one gaseous compound and the lower temperature of decomposition of poly(alkylene carbonate)polyahl or modified poly(alkylene carbonate)polyahl.

* * * * *

UNITED STATES PATENT AND TRADEMARK OFFICE
CERTIFICATE OF CORRECTION

PATENT NO. : 4,686,273

DATED : August 11, 1987

INVENTOR(S) : Robert F. Harris

It is certified that error appears in the above-identified patent and that said Letters Patent is hereby corrected as shown below:

Front page, left column, the subclass "725" of the Hostetler et al. U. S. Patent document is incorrectly stated. It should be -- 77.5 --.

Front page, right column, the name "Interscience publishers, Inc." should be -- Interscience Publishers, Inc. --.

Column 2, line 27, the word "through" should be -- throughout --.

Column 4, line 28, the title "Journal of Americal Chemical Society" should be -- Journal of American Chemical Society --.

Column 5, line 9, the word "alkylsufinyl" should be -- alkylsulfinyl --.

Column 5, line 43, insert the word "alkane" after the word "valent".

Column 6, line 1, insert the word "an" after the word "with".

Column 6, line 26, "nene carbonate)" should read -- lene carbonate) --.

Column 7, line 50, the word "β-butyl-β-ethyl-glutaric" should be -- α-butyl-α-ethyl-glutaric --.

Column 8, line 2, the word "1-5,diamino" should be -- 1,5-diamino --.

Column 8, line 48, the word "carboyxlic" should be -- carboxylic --.

UNITED STATES PATENT AND TRADEMARK OFFICE
CERTIFICATE OF CORRECTION

PATENT NO. : 4,686,273
DATED : August 11, 1987
INVENTOR(S) : Robert F. Harris

It is certified that error appears in the above-identified patent and that said Letters Patent is hereby corrected as shown below:

Column 8, line 55, the word "maleic" should be -- malonic --. Also add a "," after "malonic acid". The line should read "such as malonic acid, succinic acid, glutaric acid, adipic".

Column 14, line 40, in "Table 4" the number "37,300" should be -- 37,000 --.

Column 15, line 31, the word "dixoane" should be -- dioxane --.

Column 18, line 46, the word "volatilites" should be -- volatilities --.

Column 22, Table 13, see correction below in sample number 9.

TABLE 13

| Sample Number | Pot Temp. (°C.) | Head Temp.[1] (°C.) | Size Exclusion Chromatography of Pot Samples[2] | | | | Distillate Analysis[3] | | | | | |
|---|---|---|---|---|---|---|---|---|---|---|---|---|
| | | | Peak | $\overline{M}_n$ | $\overline{M}_w$ | PDI | Total Wt (gms) | MEG (%) | Dioxane (%) | EC (%) | DEG (%) | TriEG (%) |
| 1 | 104 | 25 | 1074 | 633 | 1217 | 1.92 | 0 | ND | ND | ND | ND | ND |
| 2 | 150 | 34 | 1074 | 677 | 1127 | 1.66 | 0 | ND | ND | ND | ND | ND |
| 3 | 166 | 122 | 949 | 650 | 1061 | 1.63 | 1.6 | 2.7 | 0 | 34.4 | 60.6 | 0.9 |
| 4 | 172 | 126 | 1030 | 704 | 1338 | 1.89 | ND | ND | ND | ND | ND | ND |
| 5 | 175 | 126 | 1074 | 721 | 1351 | 1.87 | 4.1 | 1.1 | 0 | 11.8 | 85.7 | 1.4 |
| 6 | 183 | 130 | 1230 | 815 | 1363 | 1.67 | ND | ND | ND | ND | ND | ND |
| 7 | 187 | 131 | 1438 | 842 | 1531 | 1.81 | 7.5 | 0.4 | 0 | 2.0 | 94.1 | 3.1 |
| 8 | 195 | 132 | 1700 | 971 | 1797 | 1.85 | ND | ND | ND | ND | ND | ND |
| 9 | 205 | 131 | 2075 | 1092 | 2181 | 1.99 | 1.1 | 0.5 | 0.6 | 0.5 | 94.3 | 3.2 |
| 10 | 217 | 130 | 2480 | 1234 | 2549 | 2.06 | ND | ND | ND | ND | ND | ND |
| 11 | 224 | 132 | 305. | .01 | 3096 | 2.20 | 12.8 | 0.4 | 2.6 | 0 | 90.1 | 3.6 |
| 12 | 232 | 130 | 3888 | 1607 | 3943 | 2.45 | ND | ND | ND | ND | ND | ND |

UNITED STATES PATENT AND TRADEMARK OFFICE
CERTIFICATE OF CORRECTION

PATENT NO. : 4,686,273

DATED : August 11, 1987

INVENTOR(S) : Robert F. Harris

It is certified that error appears in the above-identified patent and that said Letters Patent is hereby corrected as shown below:

Column 23, footnote of Table 13 should read "$^3$Same as 2 in Table 9."

Column 28, line 66, delete the word "the".

Column 31, line 13, delete the "O" in "SO". It should read "Q is separately in each occurrence O, S or NH".

Column 31, line 38, add an "n" between the words "an" and "valent". The line should read "The process of claim 11, wherein $R^1$ is an n valent".

Column 31, line 49, the word "poly(alkylene carbonate)polyhahl" should be -- poly(alkylene carbonate)polyahl --.

Column 31, line 53, add an "s" at the end of the word "include".

Column 32, line 44, the line should read "poly(1,2-butylene glycol).".

Column 33, line 38, delete the word "of" and add the word -- or --.

Column 33, line 40, add a "-" between "tert" and "amino" in the word "tertamino". The word should read "tert-amino".

Column 33, line 44, add a "," after the word "arylcarbonyl" and add "yl" between the "k" and the "s" in the word "alksulfinyl". The line should read "arylcarbonyl, aralkylcarbonyl, alkylsulfinyl, arylsul-".

UNITED STATES PATENT AND TRADEMARK OFFICE
CERTIFICATE OF CORRECTION

PATENT NO. : 4,686,273

DATED : August 11, 1987

INVENTOR(S) : Robert F. Harris

It is certified that error appears in the above-identified patent and that said Letters Patent is hereby corrected as shown below:

Column 34, line 13, the word "$C_{12-20}$haloalkyl" should read -- $C_{1-20}$haloalkyl --.

Column 34, line 16, the word "cyclolalkane" should read -- cycloalkane --.

Column 34, line 46, the word "polyhal" should read -- polyahl --.

Signed and Sealed this

Seventeenth Day of May, 1988

Attest:

*Attesting Officer*

DONALD J. QUIGG

*Commissioner of Patents and Trademarks*